US006967695B2

(12) United States Patent
Hoshino et al.

(10) Patent No.: US 6,967,695 B2
(45) Date of Patent: Nov. 22, 2005

(54) REMOTE CONTROL NETWORK SYSTEM FOR REMOTELY CONTROLLING A PLURALITY OF ELECTRIC APPARATUS SUCH AS HOME APPLIANCES

(75) Inventors: Takeshi Hoshino, Kodaira (JP); Yoshitaka Shibata, Tokyo (JP); Yukinobu Maruyama, Kokubunji (JP); Atsushi Katayama, Kodaira (JP); Takashi Yoshimaru, Kokubunji (JP); Youichi Horii, Kokubunji (JP); Satoko Kojima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 10/082,107

(22) Filed: Feb. 26, 2002

(65) Prior Publication Data

US 2003/0007104 A1 Jan. 9, 2003

(30) Foreign Application Priority Data

Jul. 3, 2001 (JP) ............................ 2001-202376

(51) Int. Cl.[7] .............................................. H04N 11/00
(52) U.S. Cl. ...................................................... 348/734
(58) Field of Search .................. 348/734; 340/825.72, 340/825.69, 825.25, 825.22; 345/169

(56) References Cited

U.S. PATENT DOCUMENTS 5,644,126 A * 7/1997 Ogawa .................... 250/231.1
5,926,168 A * 7/1999 Fan ............................ 345/158
6,501,515 B1 * 12/2002 Iwamura ..................... 348/734
6,600,475 B2 * 7/2003 Gutta et al. ................. 345/156
6,603,488 B2 * 8/2003 Humpleman et al. ....... 345/771
6,704,000 B2 * 3/2004 Carpenter ................... 345/158
6,717,528 B1 * 4/2004 Burleson et al. ....... 340/825.72

FOREIGN PATENT DOCUMENTS

JP 11-136776 1/1983
JP 9-238385 2/1996
JP 11-98028 9/1997
JP 2001-36976 7/1999

* cited by examiner

*Primary Examiner*—Paulos M. Natnael
(74) *Attorney, Agent, or Firm*—Reed Smith LLP; Stanley P. Fisher, Esq.; Juan Carlos A. Marquez, Esq.

(57) ABSTRACT

The field of view of a video camera is set to include electric appliances such as a refrigerator, TV set, air conditioner and lamp installed within a room. When the user operates a remote controller to emit a visible laser beam toward a controlable range including these electric appliances set within this field of view, and designate a certain one of the appliances by the resulting pointer within the controlable range, the video camera for extracting only the visible laser beam of a wave length picks up this pointer, and a control box detects the position of the pointer within the controlable range from the output of the camera so that the appliance designated by this pointer can be detected and remotely controlled by use of the remote controller.

12 Claims, 25 Drawing Sheets

FIG. 8

| | |
|---|---|
| LAMP | Li=ON OR OFF<br>BRIGHTNESS |
| AIR CONDITIONER | Ai=ON OR OFF<br>EACH VALUE OF<br>DETAILED SETTING |
| TELEVISION | Te=ON OR OFF,<br>EACH VALUE OF<br>DETAILED SETTING |
| DESIGNATE<br>REFRIGERATOR | Re=ON OR OFF,<br>DATABASE OF<br>FOODS IN<br>REFRIGERATOR |
| DESIGNATE<br>ELECTRONIC OVEN | Mi=ON OR OFF,<br>RECIPE |

REMOTE CONTROL NETWORK SYSTEM FOR REMOTELY CONTROLLING A PLURALITY OF ELECTRIC APPARATUS SUCH AS HOME APPLIANCES

BACKGROUND OF THE INVENTION

The present invention generally relates to network systems for remotely controlling a plurality of electric apparatus, and particularly to a network system suitable for use with home appliances.

Recently, most of the electric apparatuses (electrical appliances) used at home have functions for remote controlling so that they can be remotely controlled. However, in general, a particular remote controller is provided for each electric appliance. Therefore, the number of remote controllers is so increased as to be troublesome in their storage management, and that a lot of trouble is taken when a specific one is searched out from many remote controllers.

Thus, a system has been proposed that enables a single remote controller to be used in common to a plurality of electric appliances.

One example is disclosed in, for example, JP-A-11-098028 "Remote Controller Transmitter". In this document, one common remote controller (remote controller transmitter) is provided to use for a plurality of electric appliances that employ the same remote controlling codes (here, ceiling lamps). This remote controller emits infrared light and visible light superimposed on each other toward each of the electric appliances in order to control them.

The infrared light to be emitted from the remote controller generally has a certain degree of spread. Thus, when the remote controller is only loosely directed toward an electric appliance to be controlled, this appliance can receive the infrared light. When the infrared light is transmitted over a certain degree of spread, however, the infrared-sensitive portions of more than at least two of a plurality of ceiling lamps, if installed relatively close to each other in a room, could receive the infrared light and thus be controlled at a time. Therefore, in this background art, the spread of the infrared light from the remote controller is restricted to be narrow (i.e., a directivity is given to the infrared), and at the same time the visible light that is also given a directivity (here, visible laser light) is emitted from the remote controller along the same light axis as the infrared in order that the appliance irradiated with the nonvisible infrared light can be found by the user.

The above conventional example uses the remote controller for a plurality of electric appliances sensitive to the same remote controlling codes. Another example disclosed in, for example, JP-A-11-136776 is a system capable of using a single remote controller common to a plurality of electric appliances that employ different remote controlling codes.

In this system, the remote controlling codes for the electric appliances are previously stored in the built-in memory of the remote controller, and one of the codes is selected for the desired appliance by operating the key input portion of the remote controller while the contents are being displayed on this remote controller. The remote controlling code for the desired appliance to be controlled is thus read from the memory, and the infrared light modulated with this remote controlling code is emitted. Consequently, after the above operations, the user directs this remote controller toward the infrared-sensitive portion of the appliance to be controlled, thereby controlling this apparatus.

Moreover, JP-A-09-238385 discloses a technique in which GUI (Graphic User Interface) of apparatus connected in a network manner is displayed on a screen such as TV screen, and controlled by a remote controller. In addition, JP-A-2001-036976 describes a technique in which operation buttons (GUI) are displayed on a remote controller, and selectively operated to control one of the apparatus connected in a network manner.

SUMMARY OF THE INVENTION

In the examples of JP-A-11-098028, and JP-A-11-136776, since a single remote controller can be used common to a plurality of electric appliances, it is easy to keep and manage the remote controller, and there is not such trouble as to select a remote controller for each appliance.

However, even in the any ones of the above conventional examples, the infrared light is required to be emitted toward the infrared-sensitive portion of the appliance to be controlled, and thus the user needs to at least direct the remote controller to the infrared-sensitive portion of the appliance to be controlled. Particularly when operating the remote controller near the appliance to be controlled, the user cannot find where the infrared is irradiated to since the infrared emitted from the remote controller has a certain degree of spread and is invisible, and thus the user must appreciably precisely direct the remote controller to the infrared-sensitive portion. Therefore, this operationality becomes a problem for the general user.

In the example of JP-A-11-098028 in which the visible light is irradiated along the same light axis as the infrared to make the user find the position where the infrared is irradiated, use of the visible light only for the user to find the irradiated position other than the infrared light for the control causes visible-light emitting means to be added to the remote controller, thus making it complicated and large-sized in its construction, and expensive.

In the example of JP-A-09-238385, when the user is watching TV contents such as a TV program on TV screen, and when the GUI for control is displayed on that screen, the TV contents may be hidden by this GUI or the GUI may be needed to be reduced, thus making the user nervous. In addition, when operating, the user is first required to select one apparatus to be controlled from the menu, and thus the number of operations is increased, making the user feel tired.

In the example of JP-A-2001-036976, the operationality is poor because of a large number of necessary operation steps similar to the background art of JP-A-09-238385, and the remote controller must be directed toward a set-top box type controller. In this case, if an apparatus such as CTR connected in a network manner is placed on the opposite side to it within a room, the user might direct the remote controller to the CTR side by mistake, thus failing to make the infrared be received.

It is an object of the invention to provide a network system capable of controlling different types of electric appliances by a simple operation with the above problems solved.

In order to achieve the above object, according to the invention, there is provided a network system for remotely controlling objects to be controlled, such as electric appliances, including a video camera of which the field of view or a controlable range within the field is set to include the objects to be controlled and which detects only light of a particular wavelength region, a commander for generating electromagnetic waves toward a given position within the field of view or within the controlable range to form a light pointer of the particular wavelength range at the position irradiated with the electromagnetic waves, and capable of remote controlling, and a control unit that processes an output signal from the video camera to detect any one or ones, indicated by the pointer, of the objects to be controlled, receives from the commander an operation signal associated with the remote controlling on the indicated object, and supplies a control signal according to the operation signal through a network to the object indicated by the pointer, so that the object indicated by the pointer can be remotely controlled by the commander.

There is also provided a network system according to the above system, wherein, for each of the electric appliances, an apparatus recognition range is set to define the range of the appliance within the field of view of the video camera, and the control unit, when one of the apparatus recognition ranges is selected by the pointer, detects the appliance associated with the apparatus recognition range indicated by the pointer, and supplies the control signal to the detected appliance.

According to the above system, where the appliance is a lamp, and the control unit controls the lamp to be switched on and off each time the lamp is designated by the pointer, and controls the lamp to increase or decrease its brightness by moving the pointer within the apparatus recognition range of the lamp made in the on-state.

Also, where the electric appliance is an air conditioner, a projector is additionally provided to project an image on a region other than the apparatus recognition ranges that are included within the field of view or the controlable ranges, the control unit controls the air conditioner to be switched on and off each time the air conditioner is designated by the pointer, and the control unit controls the projector by designating the air conditioner by the pointer and by proper remote control operations on the commander, to display an operation panel for the air conditioner within the field of view or within the controlable range so that the air conditioner can be remotely controlled on the operation panel.

In addition, where the electric appliance is a television set, a projector is additionally provided to project an image on a region other than the apparatus recognition ranges within the field of view or the controlable ranges, the control unit controls the television set to be switched on and off each time the television set is designated by the pointer, and the control unit controls the projector by use of the pointer to indicate the television set and by use of the commander to make a certain remote controlling operation so that an operation panel for the television set can be displayed on a region within the field of view or the controlable range and that the television set can thus be remotely controlled on the operation panel.

Moreover, where the electric appliances are a television set and a refrigerator, the control unit registers the refrigerator to be in a designated state by specifying the refrigerator by the pointer, and under the condition that the specification of the refrigerator is registered, the control unit controls the television set by use of the pointer to designate the television set, and by use of the commander to make a certain remote controlling operation, so that the state in which foods are placed in the refrigerator can be displayed on the television set.

Also, where the electric appliances are a television set, a refrigerator and an electronic oven, the control unit registers the refrigerator and the electronic oven to be in a registered state by use of the pointer to designate the refrigerator and the electronic oven, and under the condition that the designation of the refrigerator and the electronic oven is registered, the control unit controls the television set by use of pointer to designate the television set and by use of the commander to make a certain remote controlling operation, so that information of possible recipes using foods placed in the refrigerator is displayed on the television set.

Additionally, where the electric appliances are a television set, a refrigerator and an electronic oven; the control unit registers the refrigerator and the electronic oven to be in a designated state by designating the refrigerator and the electronic oven by use of pointer to designate the refrigerator and the electronic oven; under the condition that the refrigerator and the electronic oven are designated, the control unit controls the television set by use of pointer to designate the television set and by use of the commander to make a certain remote controlling operation, so that the state in which foods are placed in the refrigerator is displayed on the television set; and under the condition that the state in which foods are placed in the refrigerator is displayed on the television set, the control unit controls the television set by registering the electronic oven, so that information of possible recipes using foods placed in the refrigerator can be displayed on the television set.

Also, a projector is additionally provided to project an image on a region other than the apparatus recognition ranges within the field of view or the controlable ranges, and by depicting a frame by the pointer on a region other than the apparatus recognition ranges within the field of view or the controlable ranges, the control unit detects the position of the frame from the output of the video camera, and controls the projector to project and display an image within the frame.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram showing a specific example of the apparatus status database in FIG. 7.

DESCRIPTION OF THE EMBODIMENTS

An embodiment of the invention will be described with reference to the drawings.

Figure 1:
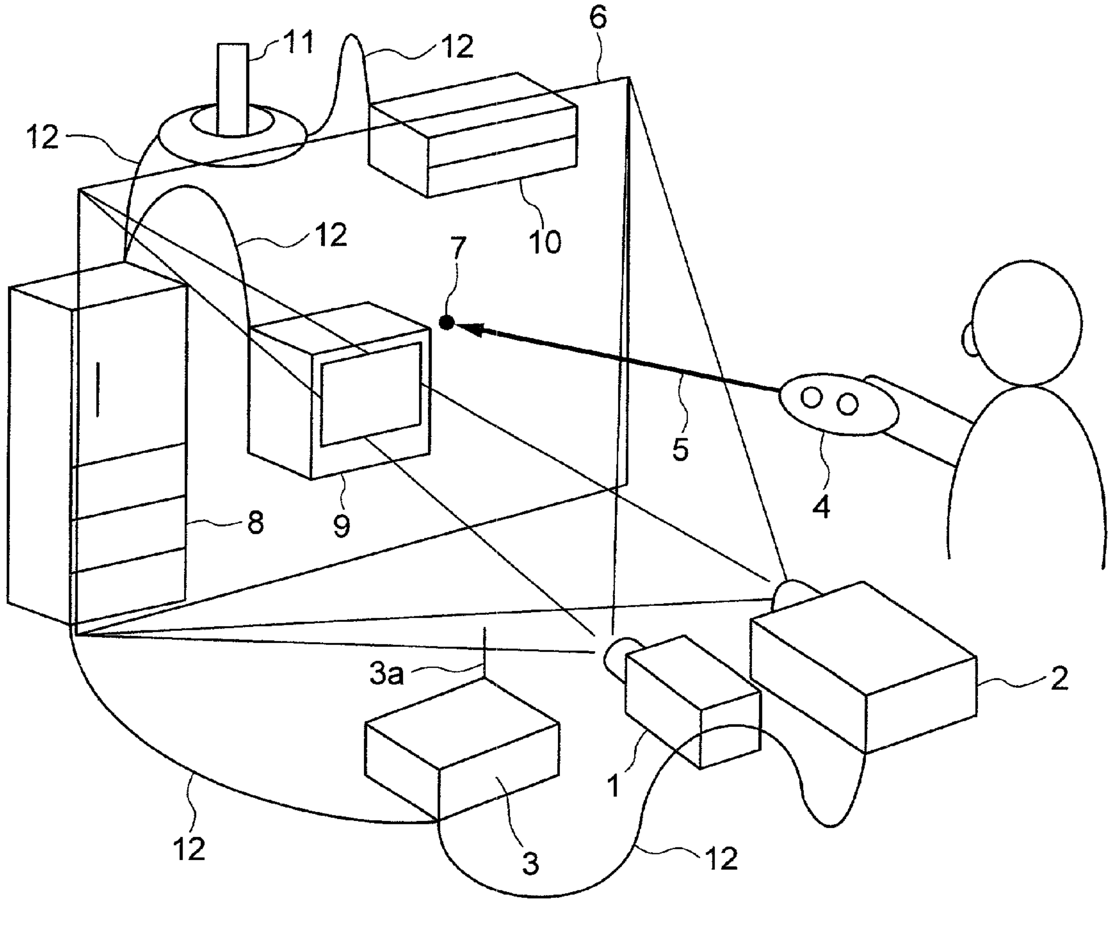
FIG. 1 is a diagram showing one embodiment of a network system according to the invention.

FIG. 1 is a diagram showing one embodiment of a network system according to the invention. Referring to FIG. 1, there are shown a video camera 1, a projector 2, a control box 3, an antenna 3*a*, a remote controller 4, a laser beam 5, a controlable range 6, a pointer 7, a refrigerator 8, a television receiver 9 (hereafter, referred to as TV set), an air conditioner 10, an lamp 11 and signal lines 12.

As in FIG. 1, electric apparatus to be remote controlled in this embodiment are installed within a room. These apparatus are, as illustrated, electric appliances such as the refrigerator 8, TV set 9, air conditioner 10, lamp 11 and electronic oven (not shown). These electric appliances are generally arranged near the wall within a room. Here, for the sake of convenience of explanation, it is assumed that these electric appliances 8~11 are placed on the same wall side within this room. In addition, the video camera 1 and projector 2 are installed with this room. This video camera 1 is fixedly placed so that its field of view can be set to provide the controlable range 6 that includes all these electric appliances 8~11. The projector 2 projects a predetermined image within this controlable range 6.

Figure 2:
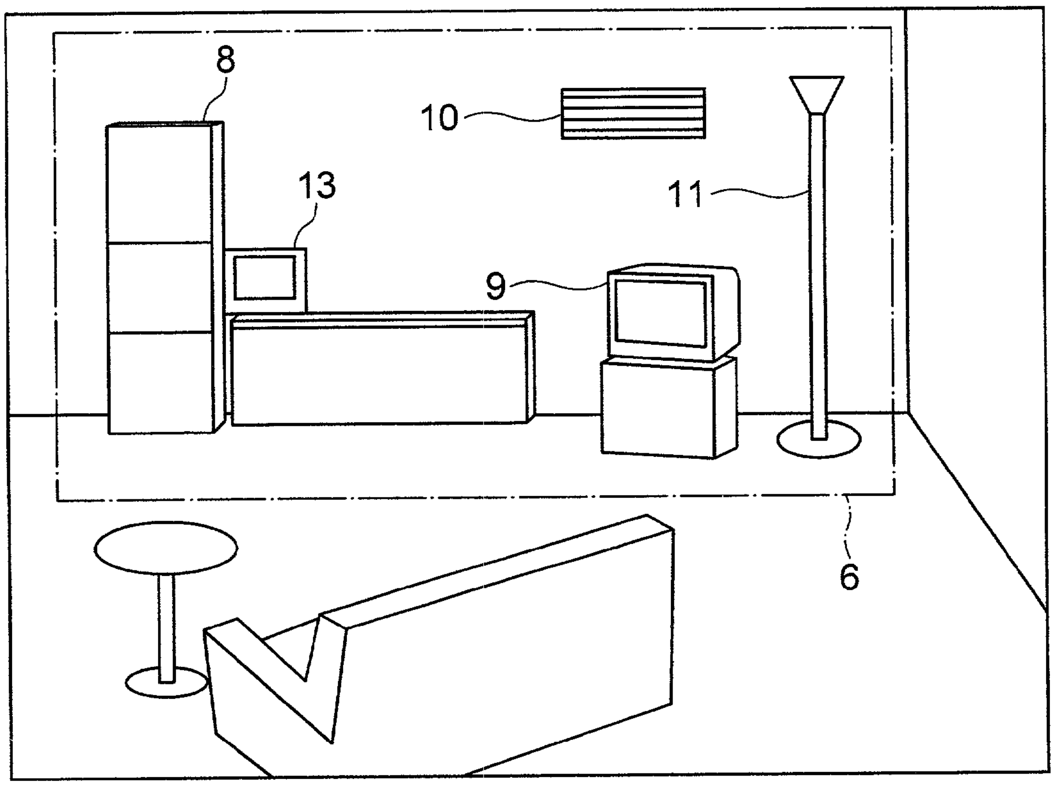
FIG. 2 is a diagram showing a specific example of the range to be controlled in FIG. 1.

FIG. 2 schematically shows a specific example of the controlable range 6. The entire scene illustrated depicts the look of the room within the field of view of video camera 1. The appliances 8~11 and electric oven 13 are placed near the wall on one side of the room, and the video camera 1 (not shown) is located at a position so that all the appliances 8~11 to be controlled can be included at least within this field of view. The controlable range 6 is also set to include all these appliances 8~11, and 13.

Although the field view of video camera 1 is hereafter assumed to be the controlable range 6, part of the field view of video camera 1 may be assumed to be the controlable range 6.

In this embodiment, as illustrated in FIG. 1, the remote controller 4 is used to generate a beam of visible laser light for remotely controlling each one of the appliances 8~11 to be controlled.

The remote controller 4 is operated by the user to emit a beam of visible laser light 5. When this laser beam 5 is irradiated over the controlable range 6, the irradiated point appears as the pointer 7 on any one of the wall surface (not shown) and the surfaces of appliances 8~11 within the controlable range, and this pointer 7 is picked up by the video camera 1.

The control box 3 is connected to the video camera 1, projector 2 and appliances 8~11 by way of signal lines 12, and supplied with the output from the video camera 1, and it controls the projector 2 and appliances 8~11. The control box 3 has the receiving antenna 3*a*, which can receive an radio information signal transmitted from the remote controller 4.

Figure 3:
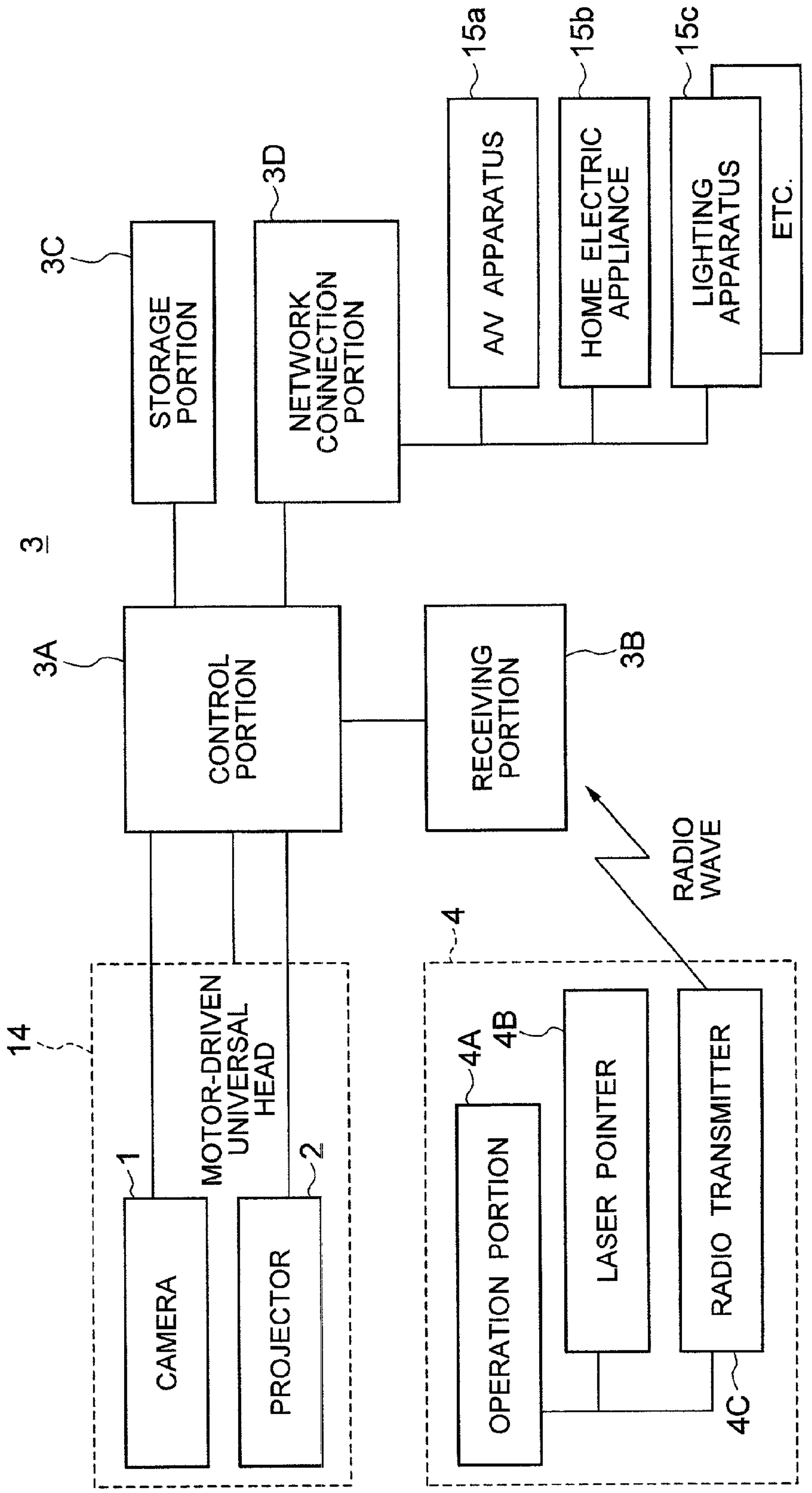
FIG. 3 is a block diagram showing the functional elements and the connection thereof in FIG. 1.

FIG. 3 is a block diagram showing the functions of each element given in FIG. 1 and the connection thereof. Referring to FIG. 3, there are shown a control portion 3A, a receiving portion 3B, a storage portion 3C, a network connection portion 3D, an operation portion 4A, a laser pointer 4B, a radio transmitter 4C, a motor-driven universal head (camera platform) 14, A/V equipment 15*a*, a home appliance 15*b*, and an illuminator 15*c*. In FIG. 3, like elements corresponding to those in FIG. 1 are identified by the same reference numerals.

The video camera 1 and projector 2 in FIG. 3 are fixed on the motor-driven camera platform 14. This motor-driven camera platform 14 is used to adjust the field of view when the video camera 1 and projector 2 are installed within a room. The control box 3 includes the control portion 3A, receiving portion 3B, storage portion 3C and so on. The control portion 3A is connected through the network connection portion 3D to electric appliances, i.e., the A/V equipment such as TV set 9 and stereo components shown in FIG. 1, the home appliance 15*b* such as air conditioner 10, refrigerator 8, electronic oven or electric washer shown in FIG. 1, and the illuminator 15*c* such as lamp 11 shown in FIG. 1. The receiving portion 3B of the control box 3 receives via the antenna 3*a* (see FIG. 1) the signal transmitted from the remote controller 4. The control portion 3A responds to the output signal from the video camera 1 and to the received signal from the receiving portion 3B to control the projector 2 and each of the electric appliances 15*a*~15*c* to turn on and off or to make other controlling operations.

Figure 4C:
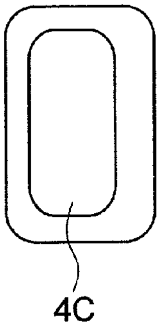
FIGS. 4A through 4E are diagrams showing a specific example of the remote controller in FIG. 1.
Figure 4A:
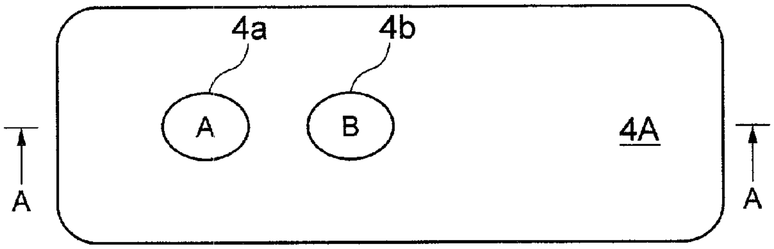
Figure 4B:
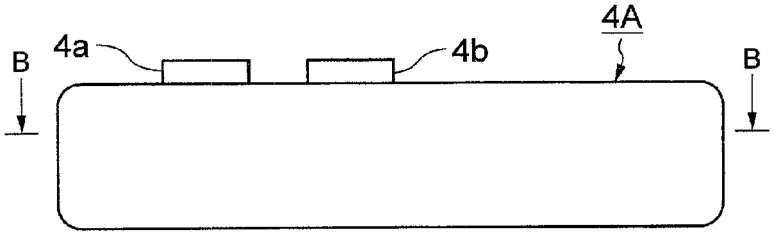

The remote controller 4 has the operation portion 4A, laser pointer 4B and radio transmitter 4C. A specific example of the remote controller 4 will be described with reference to FIGS. 4A~4E. FIG. 4A is a top view of the remote controller 4, FIG. 4B a side view thereof, FIG. 4C a front view thereof, FIG. 4D a cross-sectional view thereof taken along a line B—B in FIG. 4B, and FIG. 4E a longitudinal sectional view thereof taken along a line A—A in FIG. 4A. In these figures, 4*a* and 4*b* represent operation buttons (these are hereafter called A-button, and B-button, respectively), 4*c* a window, $4d_1$ and $4d_2$ laser generators, $4e_1$ and $4e_2$ hologram filters, 4*f* a wireless board, and 4*g* a battery. In FIGS. 4A~4E, like elements corresponding to those in FIG. 3 are identified by the same reference numerals.

In FIGS. 4A~4E, the top of the housing of the remote controller 4 has the operation portion 4A on which the A-button 4*a* and B-button 4*b* are provided, and the front side of the housing has the window 4*c* provided which allows each laser beam to pass there-through.

Figure 4D:
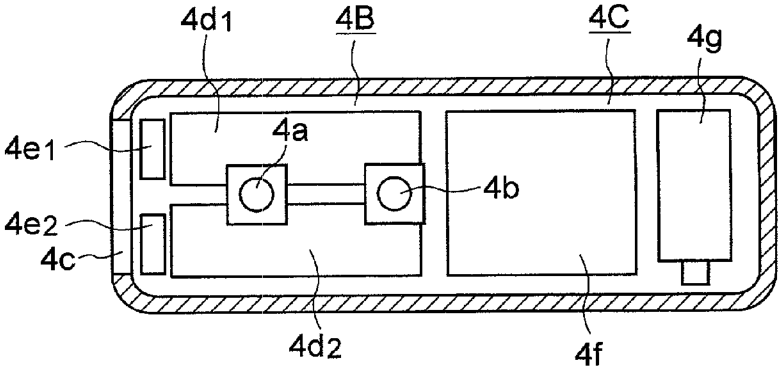
Figure 4E:
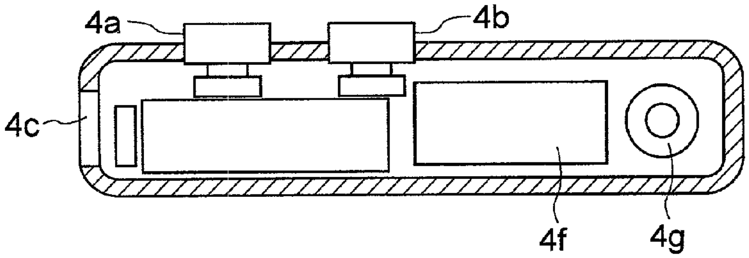

The inside of the housing of the remote controller has the laser pointer 4B, radio transmitter 4C and battery 4*g* as a power supply as shown in FIGS. 4D and 4E. The laser pointer 4B has two laser generators $4d_1$, $4d_2$, and hologram filters $4e_1$, $4e_2$ to oppose the laser generators $4d_1$, $4d_2$. The hologram filters change the visual shape of the pointer of the laser beam passing therethrough. The laser generator $4d_1$, hologram filter $4e_1$, and laser generator $4d_2$, hologram $4e_2$ constitute laser pointers, respectively. Thus, this remote controller 4 has two laser pointers provided. Here, for example, the hologram filter $4e_1$ forms the pointer 7 of shape •, and the hologram filter $4e_2$ forms the pointer 7 of shape ☆. Since these hologram filters $4e_1$, $4e_2$ diffuse the laser beams, the laser beams, if coming into view, do not affect user's eyes, or they are safe.

In addition, the radio transmitter 4C has the wireless board 4*f* on which various types of processing circuits, transmission circuits, and a transmitting antenna (not shown) are provided.

The A-button 4*a* and B-button 4*b* are constructed to be pushed twice: the first-step operation called half-push operation, and further-push operation, or the second-step operation called full-push operation. When the A-button 4*a* is half-pushed, the laser generator $4d_1$ emits a visible laser beam. When the B-button 4*b* is half-pushed, the laser generator $4d_2$ emits a visible laser beam. The visible laser beam emitted from the laser generator $4d_1$ is passed through the hologram filter $4e_1$, and irradiated to the outside through the window 4*c*. The visible laser beam emitted from the laser generator $4d_2$ is passed through the hologram filter $4e_2$, and irradiated to the outside through the window 4*c*. Since the laser beams generated when the A-button 4*a* and B-button 4*b* are operated are passed through the different hologram filters, the shapes of pointers 7 are different. Thus, from the shapes of the pointers 7, the user can easily decide that either A-button 4*a* or B-button 4*b* has been pushed. When the A-button 4*a*, B-button 4*b* is full-pushed, the radio transmitter 4C transmits a signal corresponding to the full-pushed button. At this time, or when the A-button 4*a*, B-button 4*b* is full-pushed, a visible laser beam is of course generated from the laser generator $4d_1$, $4d_2$.

Figure 5:
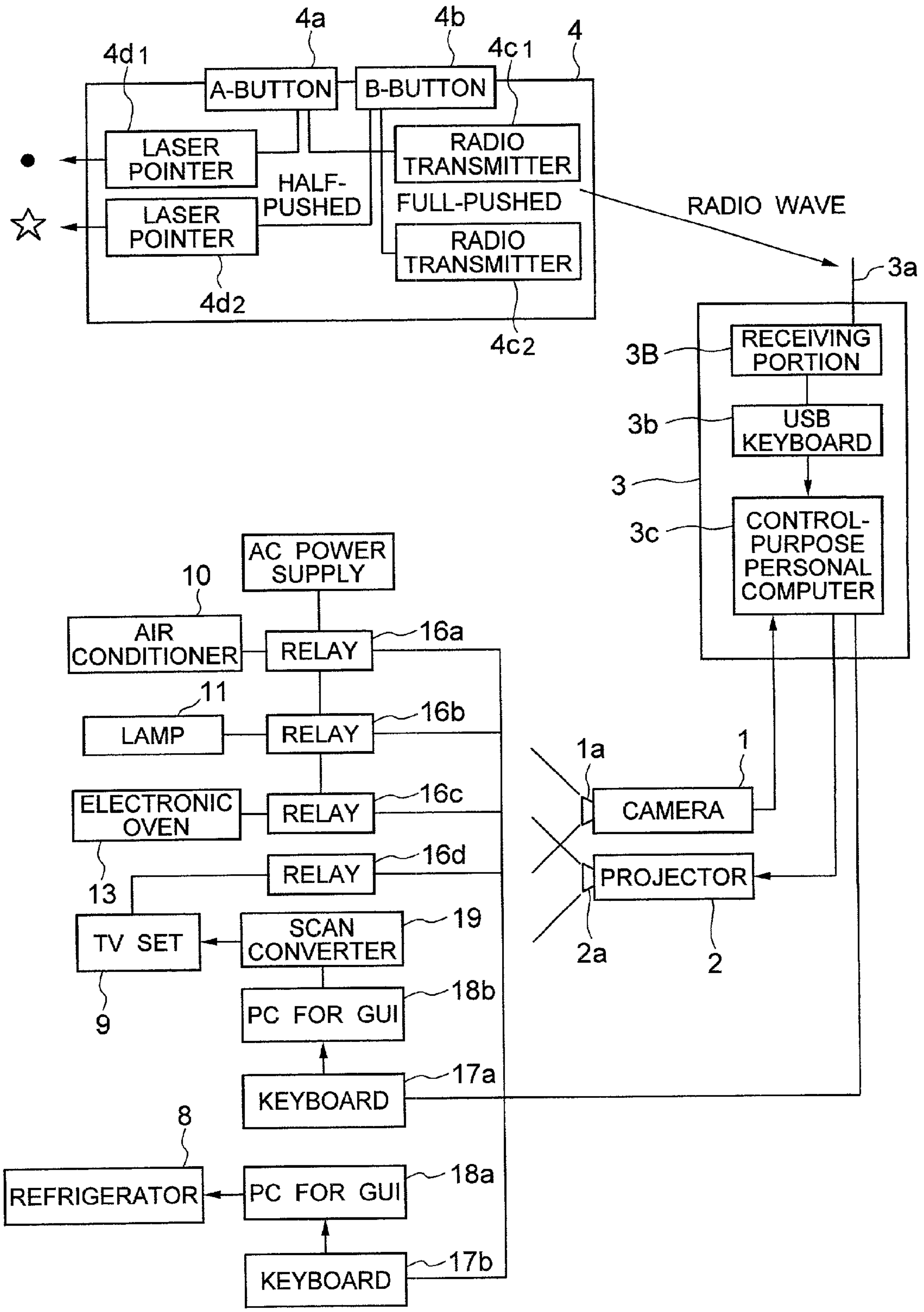
FIG. 5 is a block diagram showing the flow of signals in the embodiment of FIG. 1.

FIG. 5 is a block diagram showing the flow of signals in this embodiment. Referring to FIG. 5, there are shown a band-pass filter 1*a*, a band-cut filter 2*a*, radio transmitters $4C_1$, $4C_2$, USB (Universal Serial Bus) keyboard (modified) 3*b*, a control-purpose personal computer (personal computer) 3*c*, relays 16*a*~16*d* keyboard (modified) 17*a*, 17*b*, GUI (Graphic User Interface)-purpose personal computers 18*a*, 18*b*, and a scan converter 19. In FIG. 5, like elements corresponding to those in the previous figures are identified by the same reference numerals, and will not described.

As illustrated, the remote controller 4 has radio transmitters $4C_1$, $4C_2$ provided for A-button 4*a*, B-button 4*b*, respectively. When the A-button 4*a* and B-button 4*b* are full-pushed, the radio transmitters $4C_1$, $4C_2$ emit different signals. The signals transmitted from the radio transmitters $4C_1$, $4C_2$ are supplied to the control box 3, where they are received by the antenna 3*a*, and fed to the receiving portion 3B. The signals from the receiving portion 3B are fed through the USB keyboard 3*b* to the control-purpose personal computer 3*c*. The control-purpose computer 3*c* includes the control portion 3A, storage portion 3C and network connection portion 3D shown in FIG. 3.

The video camera 1 has the band-pass filter 1*a* detachably mounted in order that only the wavelength region of the visible laser beam emitted from the remote controller 4 can be substantially passed there-through. When this band-pass filter 1*a* is mounted, the visible laser beam emitted from the remote controller 4 and reflected from the surfaces of electric appliances or the surfaces of the walls is incident to the imaging surface of the video camera 1 as shown in FIG. 1. The video signal produced from the video camera 1 is supplied to the control portion 3A of the control box 3.

The personal computer 3*c* of the control box 3 controls the projector 2 and electric appliances 8~11, 13 on the basis of the signal from the remote controller 4 and the video signal from the video camera 1. This control operation includes the on/off operation of electric appliances 9~11, 13, and other types of controlling operations. At this time, the projector 2 is controlled to illuminate the operation surface of an appliance to be controlled of the electric appliances 9~11, 13 or the wall surface. In addition, the foods within the refrigerator 8 can be displayed on the TV set 9 so that the user can see the foods. Also, information of food products can be obtained from the present contents of food within the refrigerator 8, and it can be transmitted by way of Internet and displayed.

The above-mentioned things will be further described below. A method for specifying an electric appliance to be controlled will be first described according to this embodiment.

Referring to FIGS. 1~5, the specification of an appliance to be controlled is made by detecting the pointer 7 of the visible laser beam 5 the remote controller 4 emits from the output of the video camera 1. Thus, when the specification is made (i.e., when this embodiment is actually operated), as shown in FIG. 5, the band-pass filter 1*a* of the video camera 1 is mounted on a camera lens not shown so that only the laser beam 5 is incident to the imaging surface, or that the other images than the field of view of the video camera 1 can be cut off, or removed. Then, the personal computer 3*c* of the control box 3 detects the image of the spot of laser beam 5 from the video signal the video camera 1 has produced, and detects where this beam spot position is located within the range 6 to be controlled as shown in FIG. 2, i.e., the coordinates of this beam spot on the coordinate system set as the controlable range 6. From the results from the detection, it is decided which one of the electric appliances 8~11, 13 corresponds to the coordinates within the controlable range 6, thereby making designation of a particular appliance selected by the laser beam.

Figure 6A:
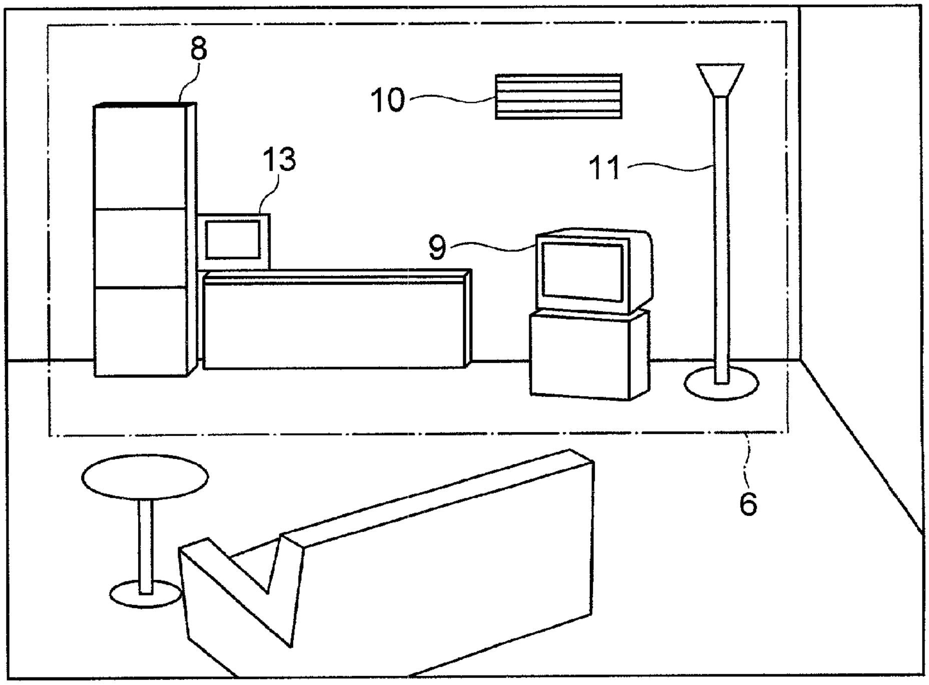
FIGS. 6A and 6B are diagrams useful for explaining the range to be controlled and the sensitive region of each appliance in the embodiment of FIG. 1.
Figure 6B:
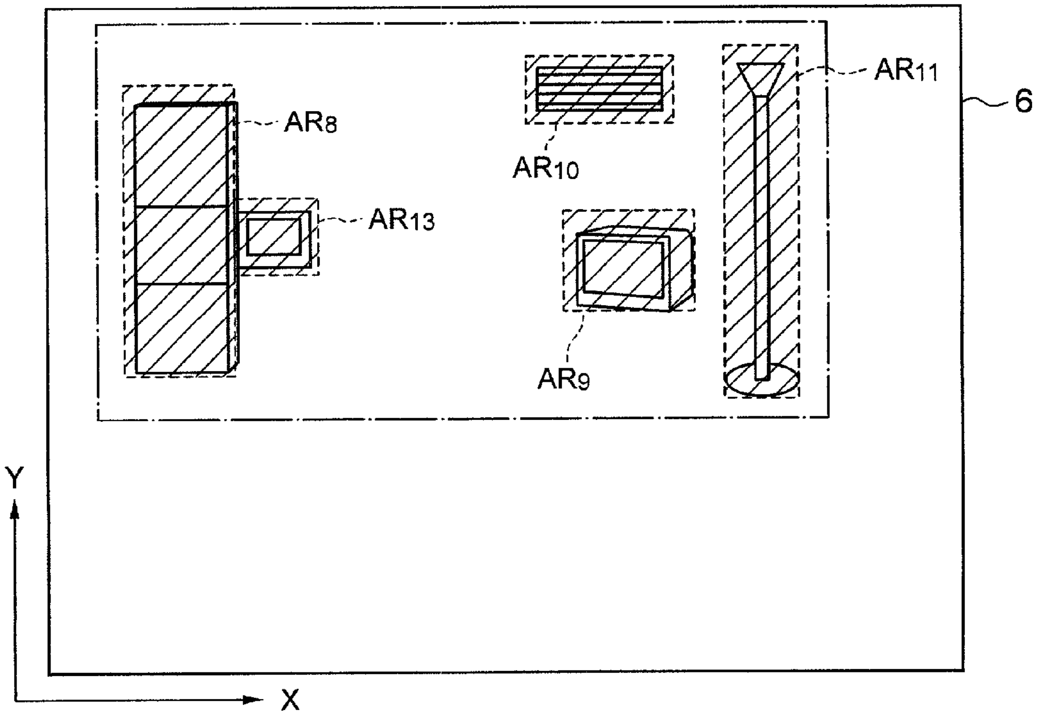

To this end, the scene within the field of view of the video camera 1 as shown in FIG. 6A (the same as in FIG. 2) is previously converted as in FIG. 6B, i.e., the controlable range 6 is expressed by a X-Y coordinate system of field view 20 of video camera 1, and the regions (hereafter, called apparatus recognition range) of the electric appliances 8~11, 13 to be controlled are expressed by a x-y coordinate system within the controlable range 6. Additionally, this information is previously stored in the storage portion 3*c* (see FIG. 3) of the control box 3. In FIG. 6B, $AR_8$ is the apparatus recognition range set for the refrigerator 8, and similarly $AR_9$, $AR_{10}$, $AR_{11}$, $AR_{13}$ the apparatus recognition ranges set for TV set 9, air conditioner 10, lamp 11, electronic oven 13. Therefore, when the pointer 7 detected by the video camera 1 points to the refrigerator 8, the image position (hereafter, called point position) of the pointer 7 within the controlable range 6 in FIG. 6B is included within the apparatus recognition range $AR_8$ of the refrigerator 8. Thus, the personal computer 3c decides that this refrigerator 8 is designated by the laser beam (hereafter, referred to as "specified by pointer"). Other electric appliances are also specified as described above.

While the apparatus recognition range includes the range that the appliance actually occupies, and is shown in a rectangular shape that is slightly larger than this range, it is not limited to this shape, but may be shown by the range itself that the electric appliance actually occupies, or shown in other shapes.

The setting of the controlable range 6 within the field view of video camera 1 and the apparatus recognition range of each appliance within this controlable range 6 can be made as described later by the operation of remote controller 4 and operation of the control box 3, or by use of a dedicated purpose apparatus (personal computer). In this case, the band-pass filter 1a is removed from the camera lens, and the video signal produced from the video camera 1 is supplied to the personal computer, and processed while viewing the displayed image. Data showing the positional relation of the apparatus recognition range of each electric appliance to the field view 20 of video camera 1 shown in FIG. 6B (this data is hereafter referred to as arrangement information of apparatus recognition range), obtained by this operation, is supplied to the control box 3 and stored in the storage portion 3c.

Figure 7:
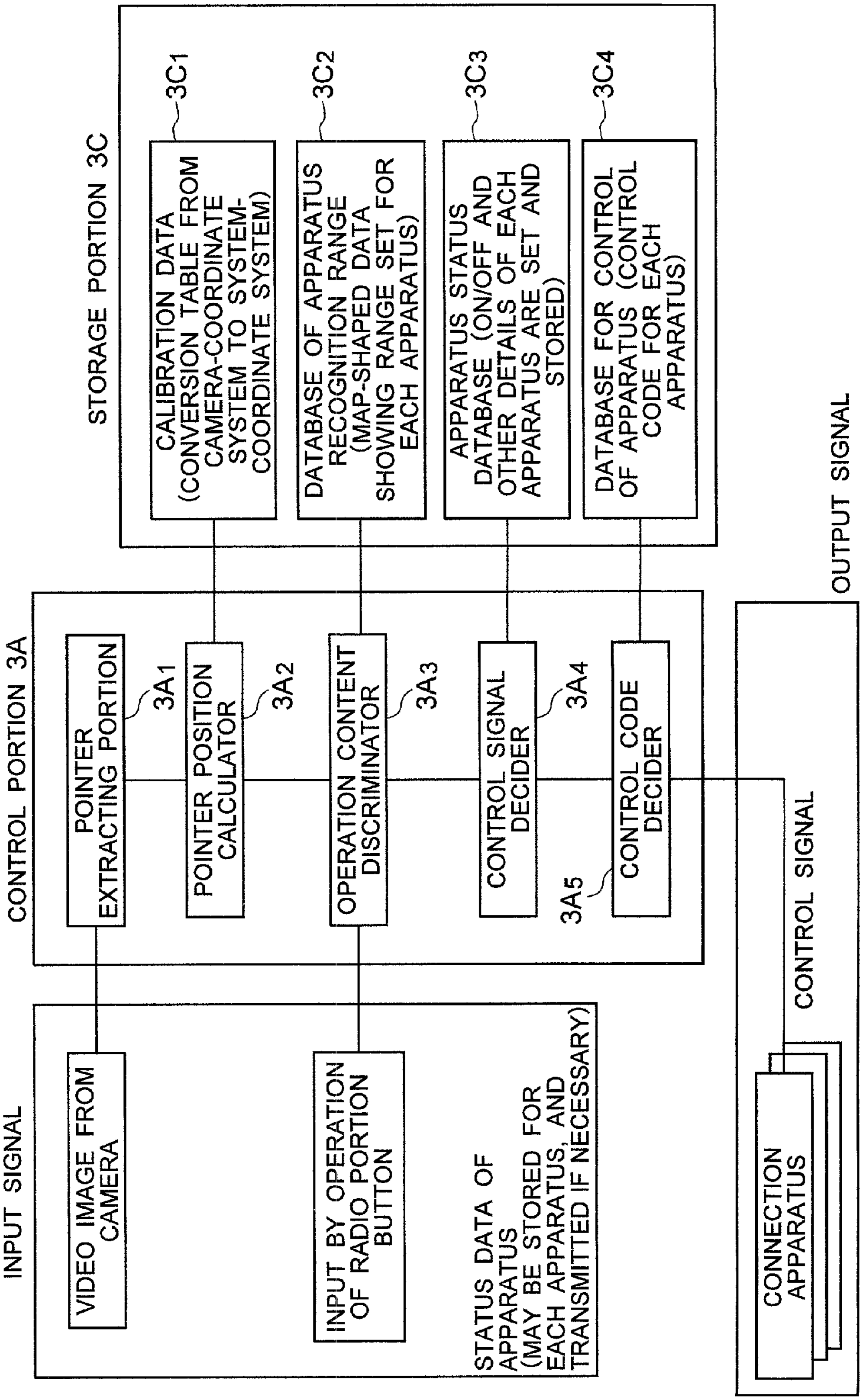
FIG. 7 is a diagram showing the constructions of the control portion and storage portion of a personal computer in FIG. 5.

FIG. 7 shows the functions of each of the control portion 3A and storage portion 3C of the personal computer 3c shown in FIG. 5. In FIG. 7, $3A_1$ represents a pointer extractor, $3A_2$ a pointer position calculator, $3A_3$ an operation content discriminator, $3A_4$ a control signal decider, $3A_5$ a control code decider, $3C_1$ a calibrator, $3C_2$ an apparatus recognition range database, $3C_3$ an apparatus status database, and $3C_4$ an apparatus control database.

In FIG. 7, the storage portion 3C has a conversion table stored for coordinates conversion by which the variation of field view of video camera 1 is compensated for, i.e., for converting the camera coordinate system to a correct coordinate system (system frame of reference), as the calibration data $3C_1$. When a camera image is obtained from the video camera 1 with the band-pass filter 1a mounted on the lens, the pointer extractor $3A_1$ of the control portion 3A extracts the image of the pointer 7 (see FIG. 1) from the obtained image and determined in its position on the camera coordinate system. The pointer position calculator $3A_2$ converts pointer position to the coordinates on the system frame of reference by use of the calibration data $3C_1$ of the storage portion 3C.

In the storage portion 3C is stored the arrangement information of apparatus recognition ranges in which the apparatus recognition ranges $AR_8$~$AR_{11}$, $AR_{13}$ shown within the controlable range 6 in FIG. 6B are expressed by x-y coordinate as the apparatus recognition range database $3C_2$. The operation content discriminator $3A_3$ of the control portion 3A decides which apparatus recognition range the pointer position expressed by the system frame of reference (x-y coordinate system) obtained by the pointer position calculator $3A_2$ is included in on the basis of this apparatus recognition range database $3C_2$. Thus, the electric appliance specified by the pointer 7 generated when the user operates the remote controller 4 as shown in FIG. 1 can be found.

As illustrated in FIG. 7, in the storage portion 3C is also stored status parameters that indicate the on/off status of each appliance 8~11, 13 within the controlable range 6, and other status settings as apparatus status database $3C_3$. FIG. 8 shows a specific example of the apparatus status database $3C_3$. Here, Li, Ai and Te represent status parameters showing the on/off status of the lamp 11, air conditioner 10 and TV set 9, and Re and Mi denote status parameters indicating if the refrigerator 8 and electronic oven 13 are respectively specified. The designation of electronic oven 13 and refrigerator 8 means that the internal states of electronic oven 13 and refrigerator 8 are specified in order to be displayed on the TV set 9 (in this case, the TV set 9 is also required to specify for that designation). If the electronic oven 13, for example, is designated as described above, the internal state of this electronic oven 13 is displayed on the TV set 9.

Thus, when the pointer position on the x-y coordinate system is detected, and when the signal generated from the remote controller 4 by the button operation is received by the receiving portion 3B (see FIG. 3), the operation content discriminator $3A_3$ discriminates the contents of the operation of remote controller 4 from this received signal and the detected pointer position, and the result of the discrimination is supplied to the control signal decider $3A_4$.

Thus, the control signal decider $3A_4$ detects the state of the electric appliance of the apparatus recognition range found by the operation content discriminator $3A_3$ by use of the apparatus status database $3C_3$, and decides the control signal for this appliance from the detection result and the found operation content of remote controller 4. If this received signal is, for example, a command signal to make the air conditioner 10 in the on-state, the control signal decider $3A_4$ detects, from the apparatus status database $3C_3$, that this received signal is a signal of the status parameter of air conditioner 10, and that this air conditioner 10 is now in the off-state, and decides the control signal for turning air conditioner 10 on.

In the storage 3C is stored apparatus control database $3C_4$ with codes (control codes) set according to the types of control for each electric appliance. The control code decider $3A_5$ converts the control signal decided by the control signal decider $3A_4$ to an associated control code on the basis of the apparatus control database $3C_4$, and supplies it to an electric appliance as a connected apparatus to be controlled.

Next, a description will be made of the operation of this embodiment associated with the operation of the remote controller 4.

Figure 9:
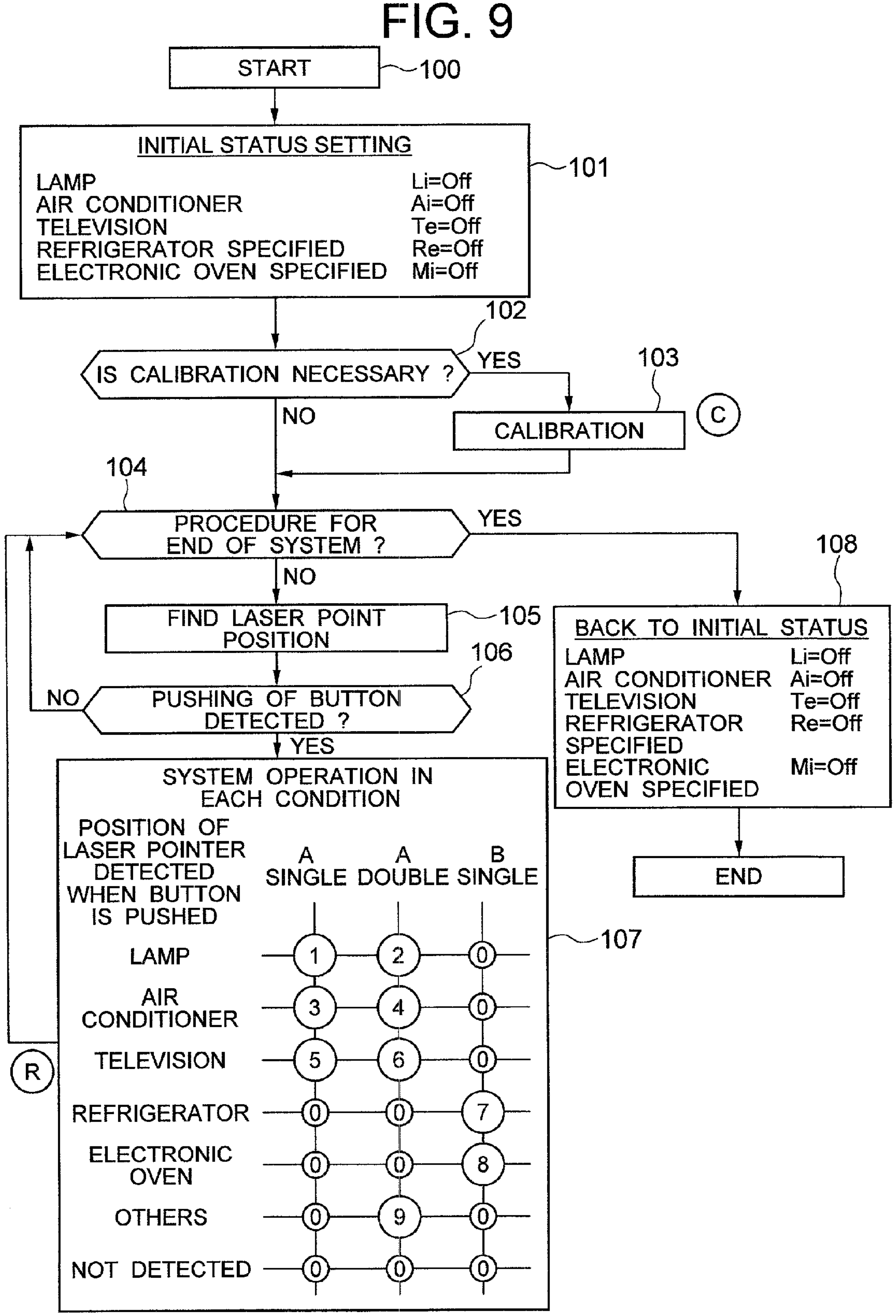
FIG. 9 is a flowchart of a main routine involved in the operation of the remote controller in the embodiment of FIG. 1.

FIG. 9 is a flowchart of the main routine for that operation.

Referring to FIGS. 5 and 9, if a main switch, not shown, that is provided at the entrance of a room in which the system according to this embodiment is installed, is turned on, the control box 3 and video camera 1 are powered to be operative (step 100).

The personal computer 3c of the control box 3 initialize the apparatus status database $3C_3$ (see FIG. 7) in the storage portion 3C to make the status parameters of electric appliances 8~11, 13 off, and turns the relays 16a~16d off, thereby causing these electric appliances 8~11, 13 to be in the off-state so that the electronic oven 13, refrigerator 8, and so on are not designated (step 101).

Then, it is decided if calibration is necessary (step 102). If it is not necessary, the routine goes to step 104. If it is necessary, calibration is made (step 103), and the routine goes to step 104. The information of if calibration is necessary is previously set in the personal computer 3C. If it is set, after the initialization in step 101, the routine surely goes to step 103. If it is not set, the routine does not go to step 103, but to step 104.

FIG. 10 is a flowchart of a specific example of the processing in step 103.

This calibration operation includes the correction necessary when the field of view of video camera 1 has been changed (field-view calibration), and the setting of apparatus recognition ranges.

Figure 10A:
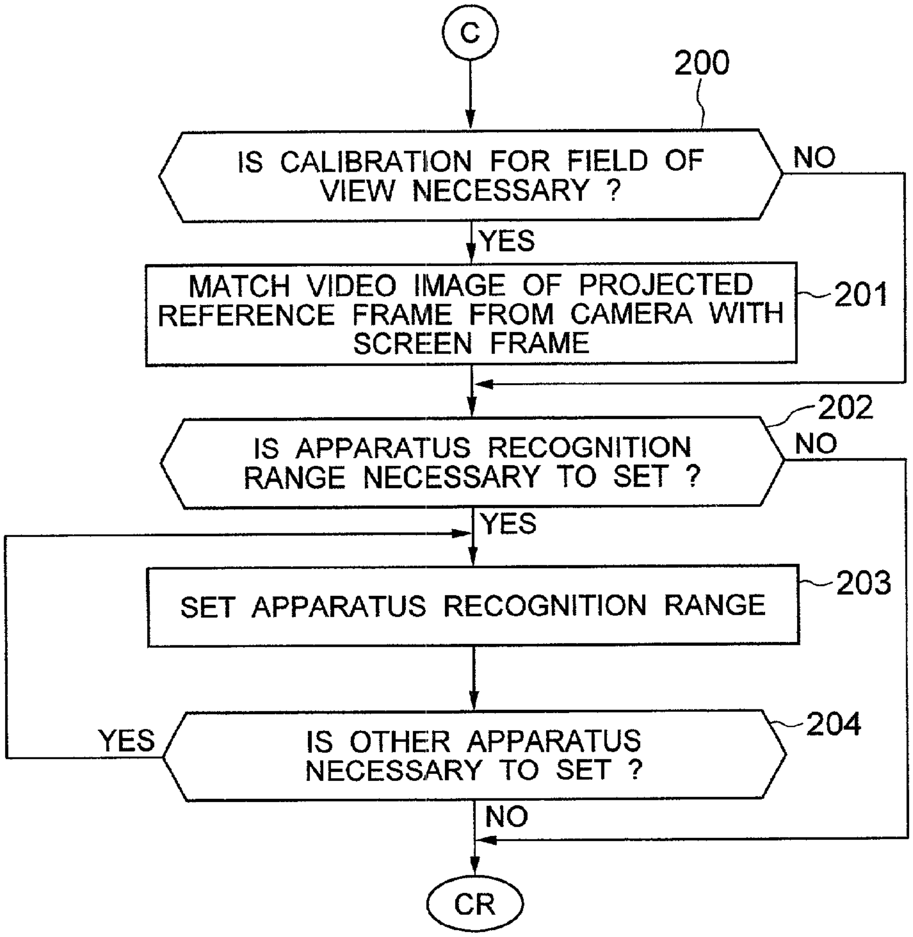
FIGS. 10A, 10B and 10C are diagrams showing a specific example of the operation of step 103 in FIG. 9.
Figure 10B:
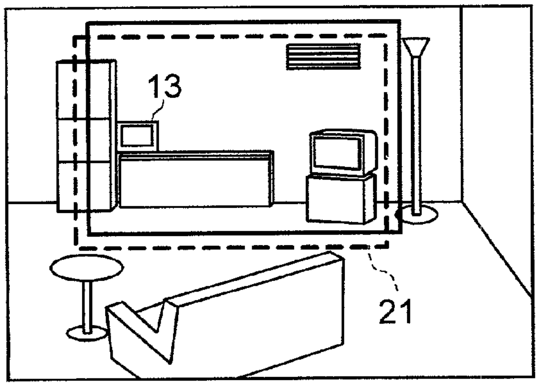

In FIG. 10A, it is first decided if the field-view calibration is necessary (step 200). To this end, a reference frame 21 of the same color as the visible beam from the remote controller 4 is projected by projector 2 as shown in FIG. 10B. This scene is picked up by the video camera 1 with the band-pass filter 1*a* mounted on the lens system, and the video signal from the camera is supplied to the personal computer 3*c* of the control box 3. The personal computer 3*c* extracts this reference frame 21 from this video signal, and determines the position of the reference frame 21 in the field view 20 of the video camera 1. Since the correct positional information of the reference frame 21 in the field view 20 is already stored in the storage portion 3C of the control box 3, the position of the reference frame 21 obtained from the video signal is compared with this positional information. As illustrated in FIG. 10A, if both positions are equal, it is decided that the field view calibration is not necessary (step 200), and the routine goes to step 202. If both positions are not equal, it is decided that the field view calibration is necessary (step 200), and the routine goes to step 201. In this step 201, positional correction information is calculated in order for the obtained position to be coincident with the positional information of the reference frame 21 stored in the control box 3, and used to correct the calibrator data $3C_1$, and hence the conversion table in the storage portion 3C.

After the field view calibration is finished, it is decided if the apparatus recognition range setting is necessary (step 202). When a new appliance is added or when any one of the appliances to be controlled is moved, the apparatus recognition range of this appliance is set (step 203).

If there is not any newly installed appliance, the routine goes to step 204. If, for example, the electronic oven 13 is newly added, and desired to be capable of being remotely controlled by the user using this system, the user operates for this purpose by using the USB keyboard 3*b* (see FIG. 5) of the control box 3 and the remote controller 4. At this time, as illustrated in FIG. 10A, the routine goes from step 204 back to step 203 where the apparatus recognition range for this electronic oven 13 can be set.

Figure 10C:
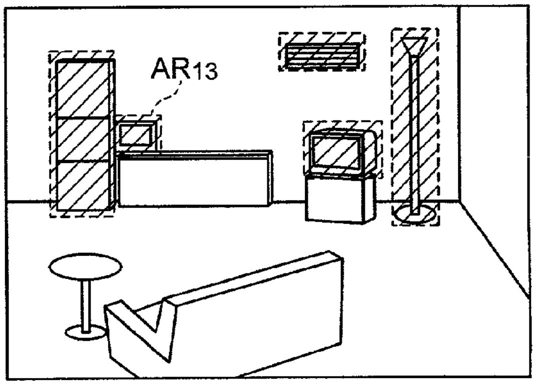

That is, in the control box 3, the USB keyboard 3*b* is operated first to set the setting mode of the apparatus recognition range, and the remote controller 4 is operated so that the laser beam 5 depicts a locus around the electronic oven 13 to include it. This locus is imaged by the video camera 1, and the personal computer 3*c* extracts the image of the locus from the output from this video camera 1. The rectangular region substantially corresponding to the locus is stored as the apparatus decision region $AR_{13}$ of this electronic oven 13 in the storage portion 3C so that it can be additionally registered in the apparatus recognition range database $3C_2$ as described with reference to FIG. 7. Thus, the apparatus recognition range $AR_{13}$ for electronic oven 13 is set as shown in FIG. 10C. In addition, the control signal for remotely controlling this electronic oven 13, and the relation between the control signal and the operation of remote controller 4 are entered by use of, for example, USB keyboard 3*b*, and the input information is registered in the storage portion 3C as described with reference to FIG. 7. When this registration is finished, operation for end of setting is performed by USB keyboard 3*b* so that the setting of the apparatus recognition range for this electronic oven 13 (step 203 in FIG. 10A) is finished, and the routine goes to step 204.

Although the method for setting the apparatus recognition range for each appliance by using the dedicated personal computer for the setting of apparatus recognition range has been described so far, the apparatus recognition range of each appliance 8~11 may be set by the operation of remote controller 4 and control box 3.

Turning back to FIG. 9, in step 104, the control box 3 is maintained active to acquire the video signal from the video camera 1 unless the above-mentioned main switch is turned off to stop the system. When the pointer 7 is detected in its position (i.e., when any one of appliances 8~11, 13 is indicated by pointer 7: step 105), it is decided if there is a received signal from the remote controller 4 with the A-and B-buttons 4*a*, 4*b* full-pushed (step 106). When the received signal is obtained, the routine goes to step 107.

In step 107, the following operations are performed according to the position of pointer 7 within the controlable range 6, and the way (single click and double click) of full-pushing the A-, and B-buttons 4*a*, 4*b* on the remote controller 4.

[Remote Controlling of Lamp 11]

Figure 11A:
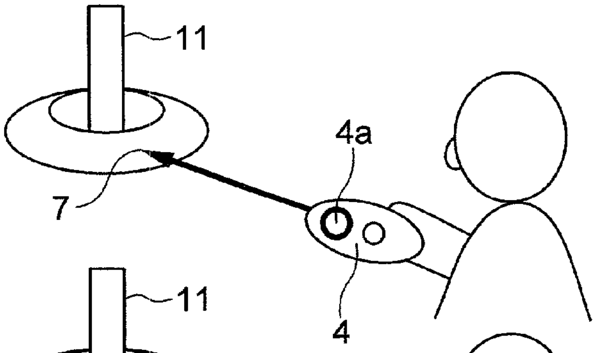
FIGS. 11A and 11B are diagrams showing examples of user's operation for controlling (1) of step 107 in FIG. 9.
Figure 11B:
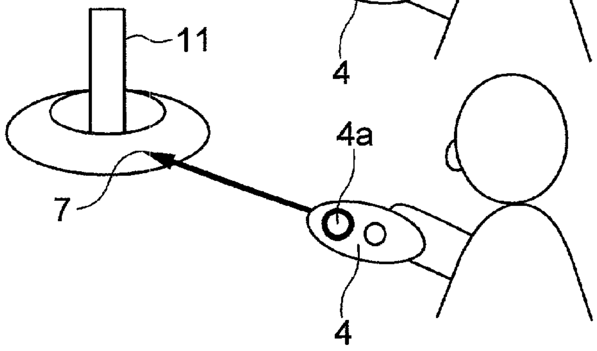

① of Step 107 in FIG. 9; i.e., the case when the pointer 7 is within the apparatus recognition range $AR_{11}$ (FIG. 6B) of lamp 11, and when the A-button 4*a* is single-clicked on remote controller 4:

This case corresponds to the operation shown in FIGS. 11A and 11B. At this time, controlling is made according to the flowchart of FIG. 12.

Figure 12:
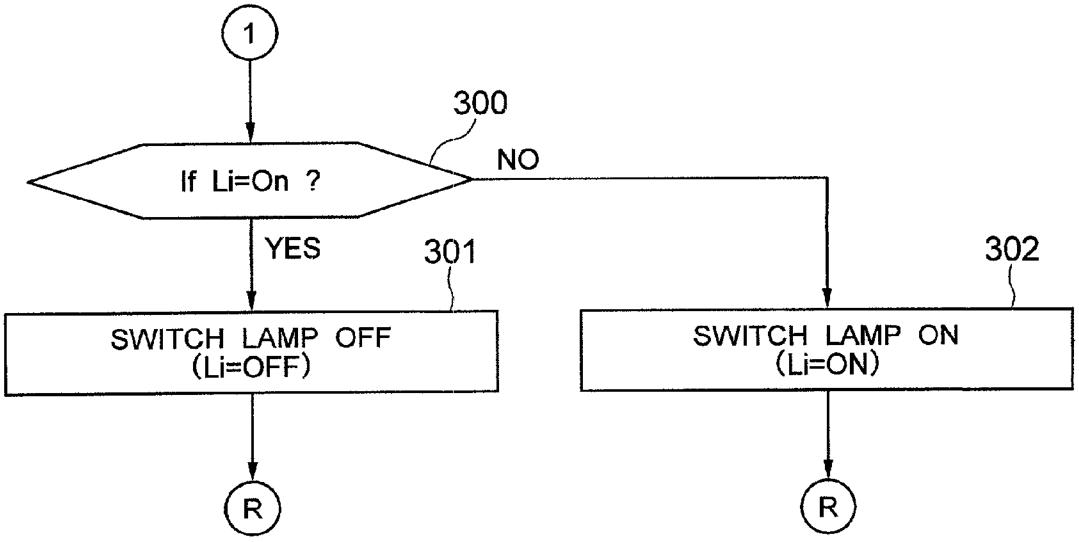
FIG. 12 is a flowchart of the user's operation in FIG. 11 to turn on and off the lamp in FIG. 1.

That is, as shown in FIG. 11A, the user half-pushes the A-button 4*a* with the remote controller 4 directed to the lamp 11 so that the pointer 7 is applied directly to the lamp 11 or its neighbor, and as shown in FIG. 11B the A-button 4*a* of remote controller 4 is once full-pushed, or single-clicked. When the personal computer 3*c* of control box 3 detects from the output from the video camera 1 that this pointer 7 is within the recognition range $AR_{11}$ of lamp 11, the status parameter Li of lamp 11 is checked on the basis of the apparatus status database $3C_3$ of storage portion 3C (FIG. 7) as shown in FIG. 12 (step 300). If Li=ON, the lamp 11 is decided to be now switched on. Then, a control signal for switching the lamp 11 off is applied to it, energizing the relay 16*b* (see FIG. 5), thereby extinguishing the lamp 11. Moreover, the status parameter Li is turned off on the apparatus status database $3C_3$ (step 301). If the lamp 11 is now off (Li≠ON in step 300), similarly the lamp 11 is switched on, and the status parameter Li on the apparatus status database $3C_3$ is turned on (step 302).

Thus, each time the A-button 4*a* of remote controller 4 is single-clicked under the condition that the lamp 11 is designated by the pointer 7, the lamp 11 is repeatedly switched on and off.

② of step 107 in FIG. 9; i.e., the case when the pointer 7 is within the apparatus recognition range $AR_{11}$ (FIG. 6B) of lamp 11, and the A-button 4*a* is double clicked on the remote controller 4:

This case corresponds to the operation shown in FIGS. 13A~13D. In this case, controlling is made according to the flowchart of FIG. 14.

Figure 13A:
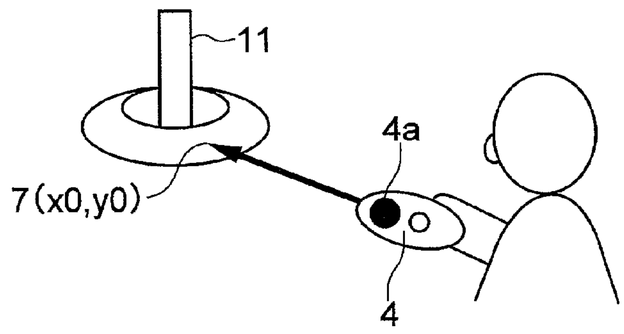
FIGS. 13A through 13D are diagrams showing the user's operation for the dimmer controlling (2) of step 107 in FIG. 9.
Figure 14:
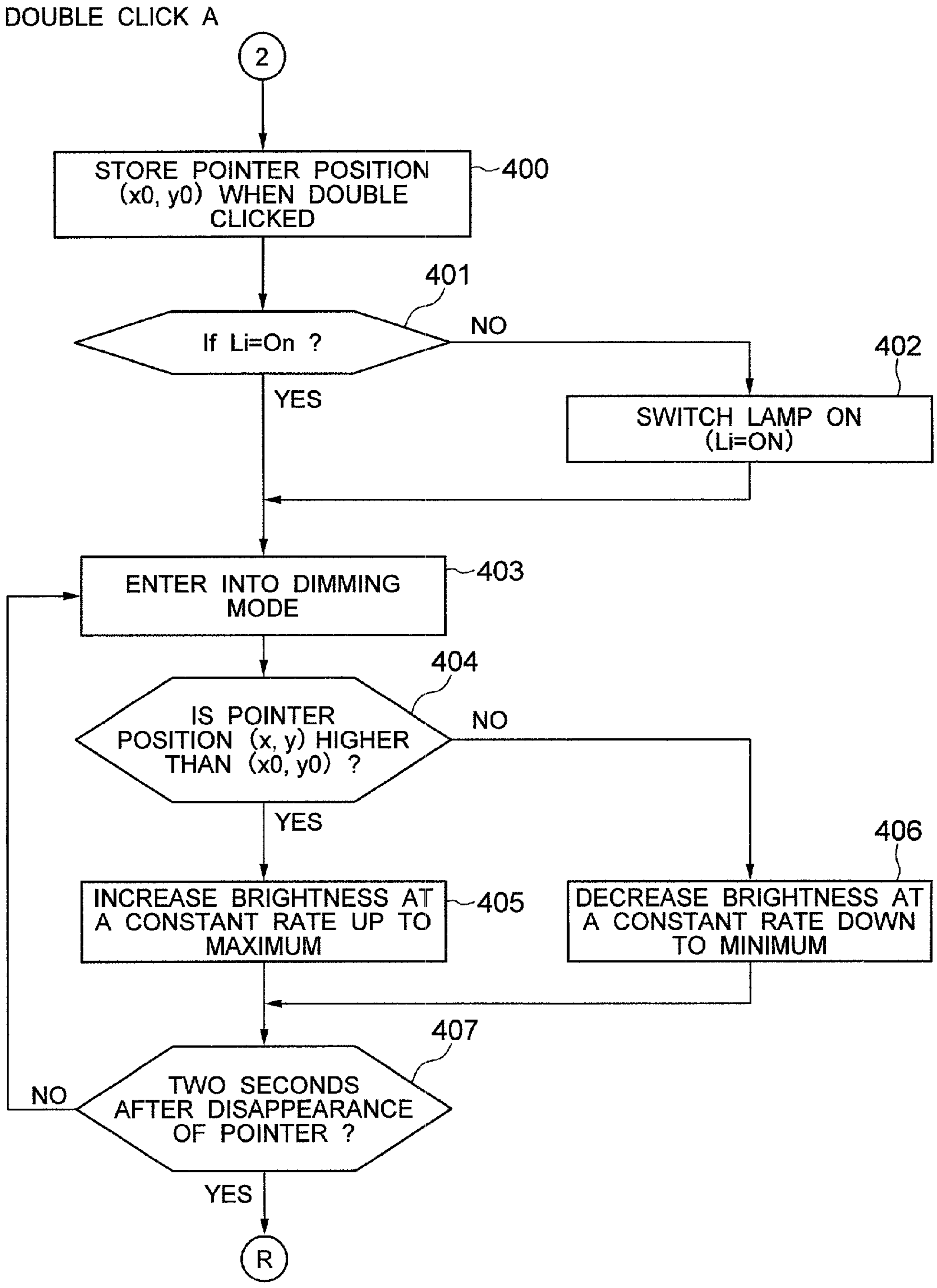
FIG. 14 is a flowchart of the dimmer controlling of the lamp by the user in FIGS. 13A through 13D.

That is, the user half-pushes the A-button 4*a* with the remote controller 4 directed to the lamp 11 so that the pointer 7 is applied directly to the lamp 11 or to its vicinity, and the A-button 4*a* of remote controller 4 is double clicked as shown in FIG. 13A. At this time, the personal computer 3*c* detects the coordinates (x0, y0) of the pointer 7 within the controlable range 6, and the coordinates (x0, y0) of the pointer 7, if being within the apparatus recognition range $AR_{11}$ of lamp 11, is stored as a reference position in the storage portion 3C (step 400 in FIG. 14). Then, if the status parameter Li of lamp 11 on the apparatus status database $3C_3$ (see FIG. 7) is ON (i.e., if the lamp 11 is on: step 401 in FIG. 14), the routine goes to step 403 where the processing enters into dimming mode. If the status parameter Li is off (i.e., if the lamp 11 is off: step 401 in FIG. 14), the personal computer 3*c* energizes the relay 16*b* (see FIG. 5), thus switching the lamp 11 on (step 402 in FIG. 14), and the routine goes to step 403.

Figure 13B:
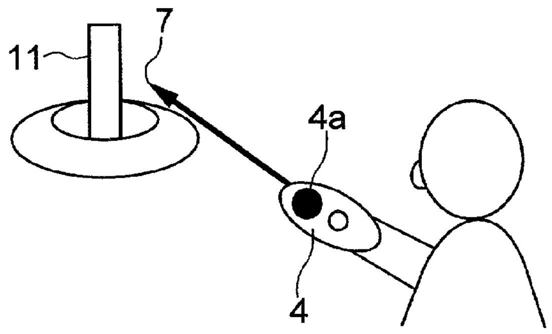
Figure 13C:
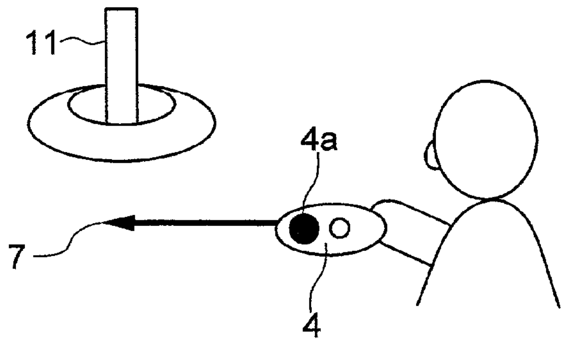

In the dimming mode (step 403 in FIG. 14), the personal computer 3*c* observes the change of the height of pointer 7 that is imaged by the video camera 1. If, now, the user changes, as illustrated in FIG. 13B, the direction of remote controller 4 to be turned more upward than when the A-button 4*a* is previously double clicked so that the pointer 7 is raised in its position to be higher than the reference position (x0, y0) that is obtained when the A-button 4*a* is double clicked, the personal computer 3*c* detects this change (step 404 in FIG. 14), controlling the brightness of lamp 11 to be raised one rank. By repeatedly shaking the pointer 7 at a higher point than this reference position (x0, y0) in the height direction, the brightness can be increased by each shake at a constant rate until the maximum (step 405 in FIG. 14). If, as shown in FIG. 13C, the pointer 7 is repeatedly shaken in the height direction at a lower point than the reference position (x0, y0) (step 404 in FIG. 14) contrary to the above case, the brightness can be decreased by each shake at a constant rate until the minimum (step 406 in FIG. 14).

Figure 13D:
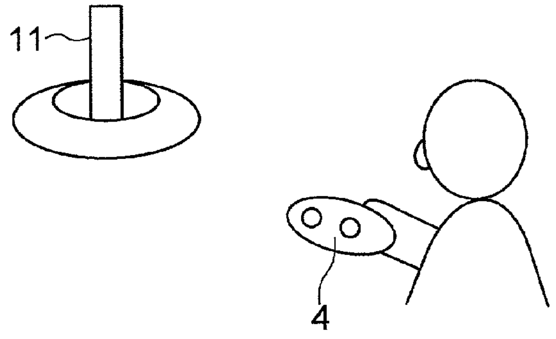

If the pointer 7 is lighted for more than two seconds (step 407 in FIG. 14), the routine goes back to step 403 where the dimming mode is again performed. If the pointer 7 continues the off-state for more than two seconds as shown in FIG. 13D, the processing goes back to step 104 in FIG. 9.

In the above dimming mode, the dimmer control signal is generated on the basis of the wireless portion button operation of A-button 4*a* in the operation content discriminator $3A_3$ and the positional change of pointer 7 detected by the pointer position calculator $3A_2$ as illustrated in FIG. 7.

Thus, the user can set the on-and off-state and dimming mode (brightness) of lamp 11 while sitting on a sofa. In addition, since this setting can be performed by directing the visible laser beam to around the lamp 11 to be controlled, the user can operate easily and without mistake.

[Remote Controlling of Air Conditioner 10]

Figure 15:
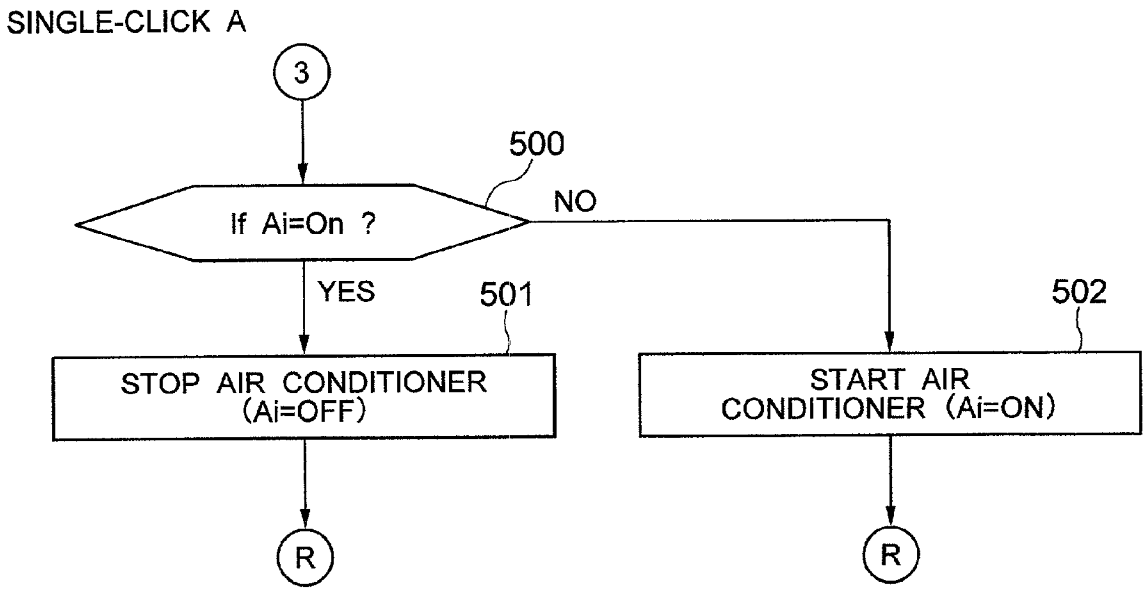
FIG. 15 is a flowchart of the on-and off-controlling (3) of an air conditioner in step 107 of FIG. 9.

③ of step 107 in FIG. 9; i.e., the case when the pointer 7 is within the apparatus recognition range $AR_{10}$ (FIG. 6B) of air conditioner 10, and when the A-button 4*a* is single-clicked on the remote controller 4:

This case corresponds to the control according to the flowchart shown in FIG. 15.

Figure 16A:
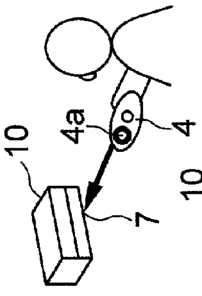
FIGS. 16A through 16G are diagrams showing examples of user's operation for the setting control (4) of the air conditioner in step 107 of FIG. 9.

That is, as shown in FIG. 16A, the user half-pushes the A-button 4*a* with the remote controller 4 directed to the air conditioner 10 so that the laser beam is applied as pointer 7 to the air conditioner 10, and the A-button 4*a* of remote controller 4 is once full-pushed, or single-clicked. When the personal computer 3*c* of the control box 3 detects from the output from the video camera 1 that the pointer 7 is within the apparatus recognition range $AR_{10}$ of air conditioner 10, it checks the status parameter Ai of air conditioner 10 on the basis of the apparatus status database $3C_3$ of storage portion 3C (FIG. 7) as shown in FIG. 15 (step 500). If Ai=ON, the air conditioner 10 is decided to be now ON, and a control signal is transmitted to the air conditioner 10, energizing the relay 16*a* (FIG. 15) to stop the air conditioner 10. Moreover, the status parameter Ai on the apparatus status database $3C_3$ is turned off (step 501). If the air conditioner 10 is now not operated (Ai≠ON in step 500), similarly the air conditioner 10 is turned on, and the status parameter Ai on the apparatus status database $3C_3$ is turned on (step 502).

Thus, each time the A-button 4*a* of remote controller 4 is single-clicked under the condition that the air conditioner 10 is designated by the pointer 7, the air conditioner 10 is repeatedly started to operate and stop.

④ of step 107 in FIG. 9; i.e., the case when the pointer 7 is within the apparatus recognition range $AR_{10}$ (FIG. 6B) of air conditioner 10, and when the A-button 4*a* is double clicked on the remote controller 4:

This case corresponds to the operation shown in FIG. 16. In this case, control is performed according to the flowchart of FIG. 17.

Figure 16B:
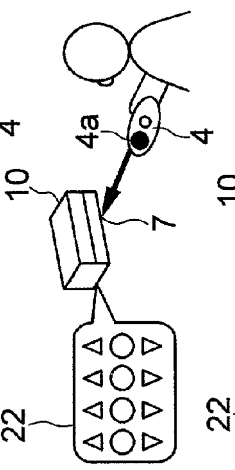
Figure 17:
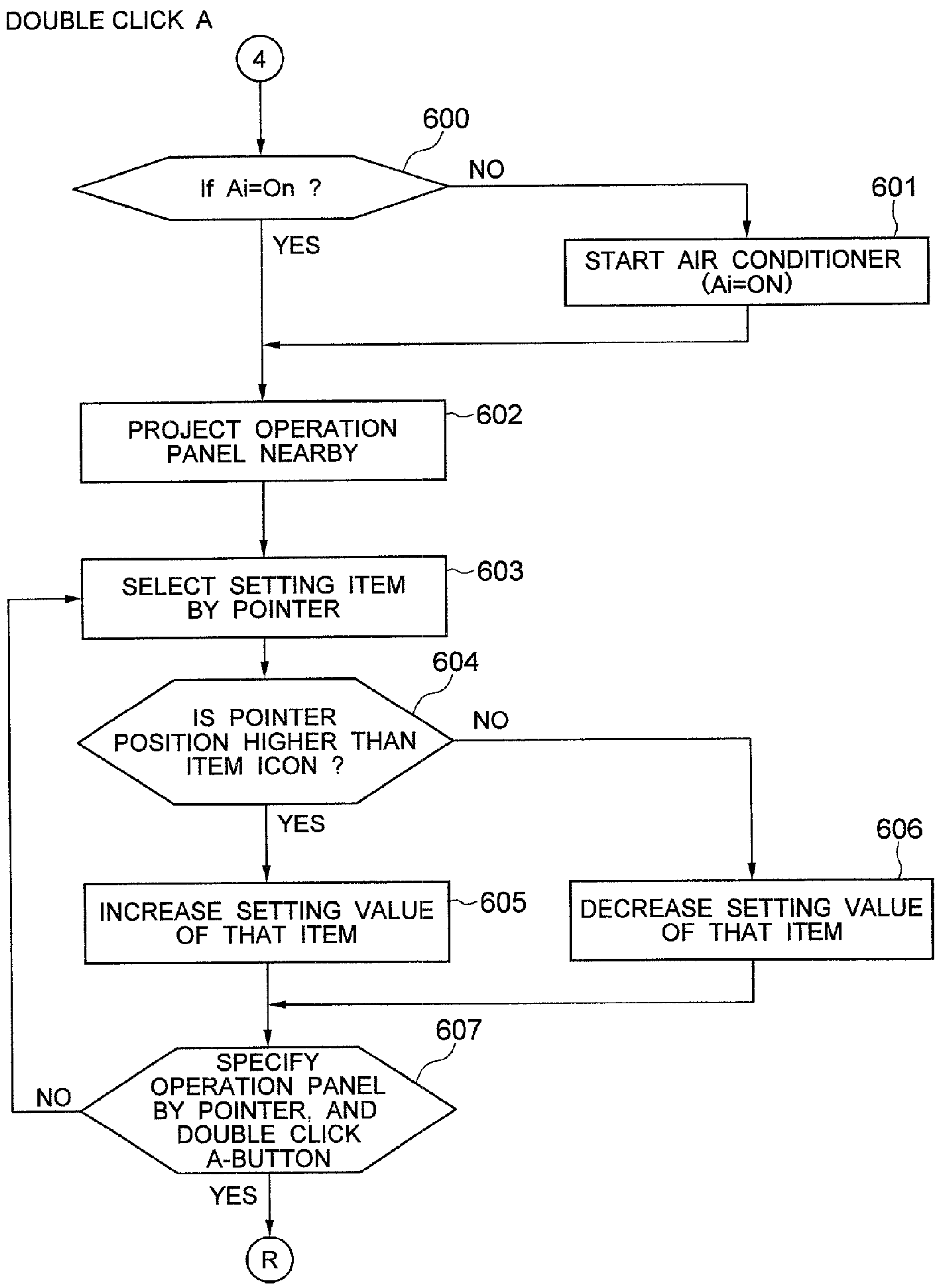
FIG. 17 is a flowchart of user's operation for setting control of the air conditioner in FIG. 13.

That is, the user half-pushes the A-button 4*a* with the remote controller 4 directed to the air conditioner 10 so that the laser beam is applied as pointer 7 to the air conditioner 10 as shown in FIG. 16A, and the A-button 4*a* of remote controller 4 is double clicked as shown in FIG. 16B. At this time, the personal computer 3*c* detects that the coordinate position of the pointer 7 within the controlable region 6 is within the apparatus recognition range $AR_{10}$ of air conditioner 10. If the status parameter Ai of the air conditioner 10 on the apparatus status database $3C_3$ (see FIG. 7) is ON (i.e., if the air conditioner 10 is operating: step 600 in FIG. 17), the routine goes directly to step 602 in FIG. 17. If this status parameter Ai is OFF (i.e., if the air conditioner 10 is at a halt), the personal computer 3*c* energizes the relay 16*a* (FIG. 5) to make the air conditioner 10 operative, so that the status parameter Ai on the apparatus status database $3C_3$ is turned ON (step 601 in FIG. 17), and the processing goes to step 602.

Figure 16C:
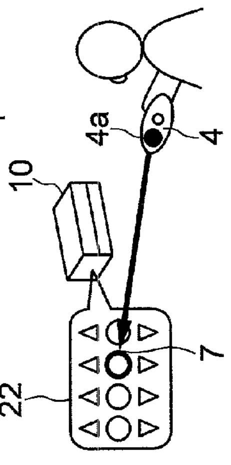

In step 602, as shown in FIG. 16B, the personal computer 3*c* reads from the storage portion 3C the image of operation panel 22 of the air conditioner as shown in FIG. 16C, and supplies it to the projector 2, permitting the projector 2 to display the panel 22 as shown in FIG. 16C. Although the displaying of operation panel 22 is performed by the projector 2 (FIG. 1), this operation panel 22 does not include the same color as the laser beam. Therefore, the image of operation panel 1*a* does not appear on the light-sensitive screen of the video camera 1 with the band-pass filter 1*a* mounted.

Figure 16D:
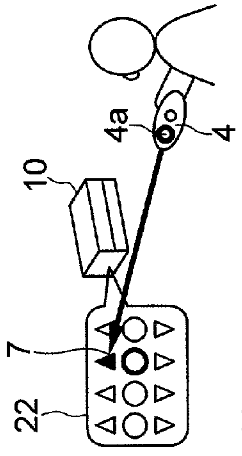
Figure 16E:
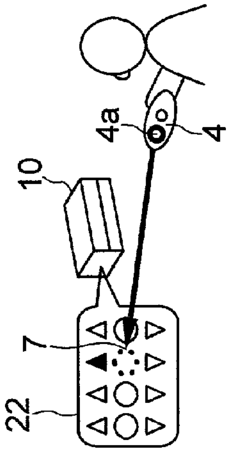
Figure 16F:
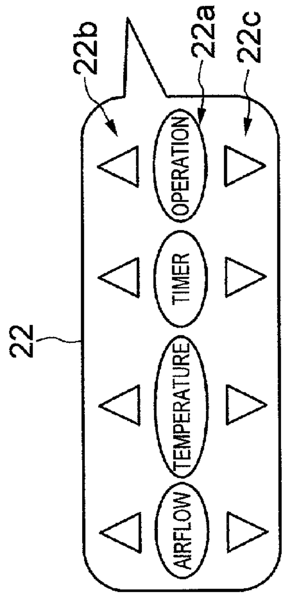
Figure 16G:
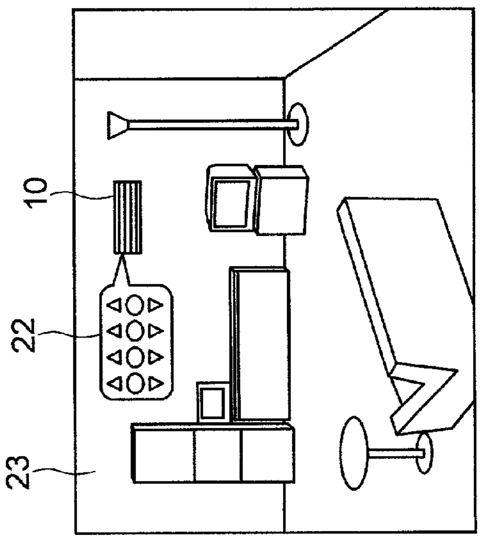

This operation panel 22 has icons 22*a* of setting items such as "airflow", "temperature", "timer" and "operation" horizontally arranged, and marks "Δ" 22*b*, "∇" 22*c* on the top and bottom of each icon 22*a* as shown in FIG. 16F. This operation panel 22 is displayed on the surface of a wall 23 near the air conditioner 10. Any one of these setting icons 22*a* and its associated marks "Δ" 22*b*, "∇" 22*c* are designated by the pointer 7, so that the operation of the air conditioner 10 can be controlled for each selected setting item.

When, for example, timer setting is tried to make, the pointer 7 is matched to the icon 22*a* of "timer", thus selecting the "timer" setting item (step 603 in FIG. 17) as shown in FIG. 16C. Then, when the duration is tried to increase, the pointer 7 is matched to the mark "Δ" on the top of the icon 22*a* of "timer" and left as it is as shown in FIG. 16D. At this time, the setting time is stepwise increased by a predetermined time, for example, one minute at a time (step 605 in FIG. 17). When the setting time of the timer is tried to decrease, the pointer 7 is matched to the mark "∇" on the bottom of the icon 22*a* of "timer", thereby making the setting time be stepwise decreased by, for example, one minute at a time (step 606 in FIG. 17).

After the above operation, the processing goes back to step 603 where control can be again made for another setting item. When the A-button 4_a_ is double clicked (step 607 in FIG. 17) under the condition that the pointer 7 is placed at any position on the operation panel 22 as shown in FIG. 16E, the setting control for the air conditioner 10 is finished, and the processing goes back to step 104 in FIG. 9.

Thus, the user can turn the air conditioner 10 on and off or set desired operation items while sitting on a sofa. In addition, since such setting operations can be performed by pointing with the visible laser beam the operation panel 22 that is magnified and displayed on the air conditioner 10 to be controlled or on a wall, the user can operate easily without mistake.

[Remote Controlling of TV Set 9]

Figure 18:
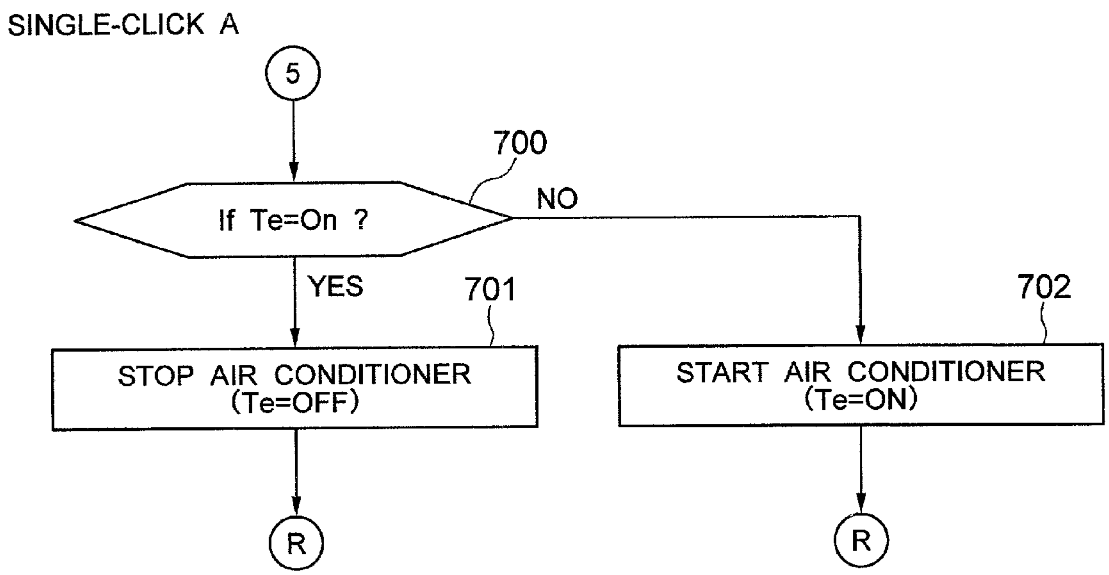
FIG. 18 is a flowchart of the on, off controlling (5) of TV set in step 107 of FIG. 9.
Figure 19:
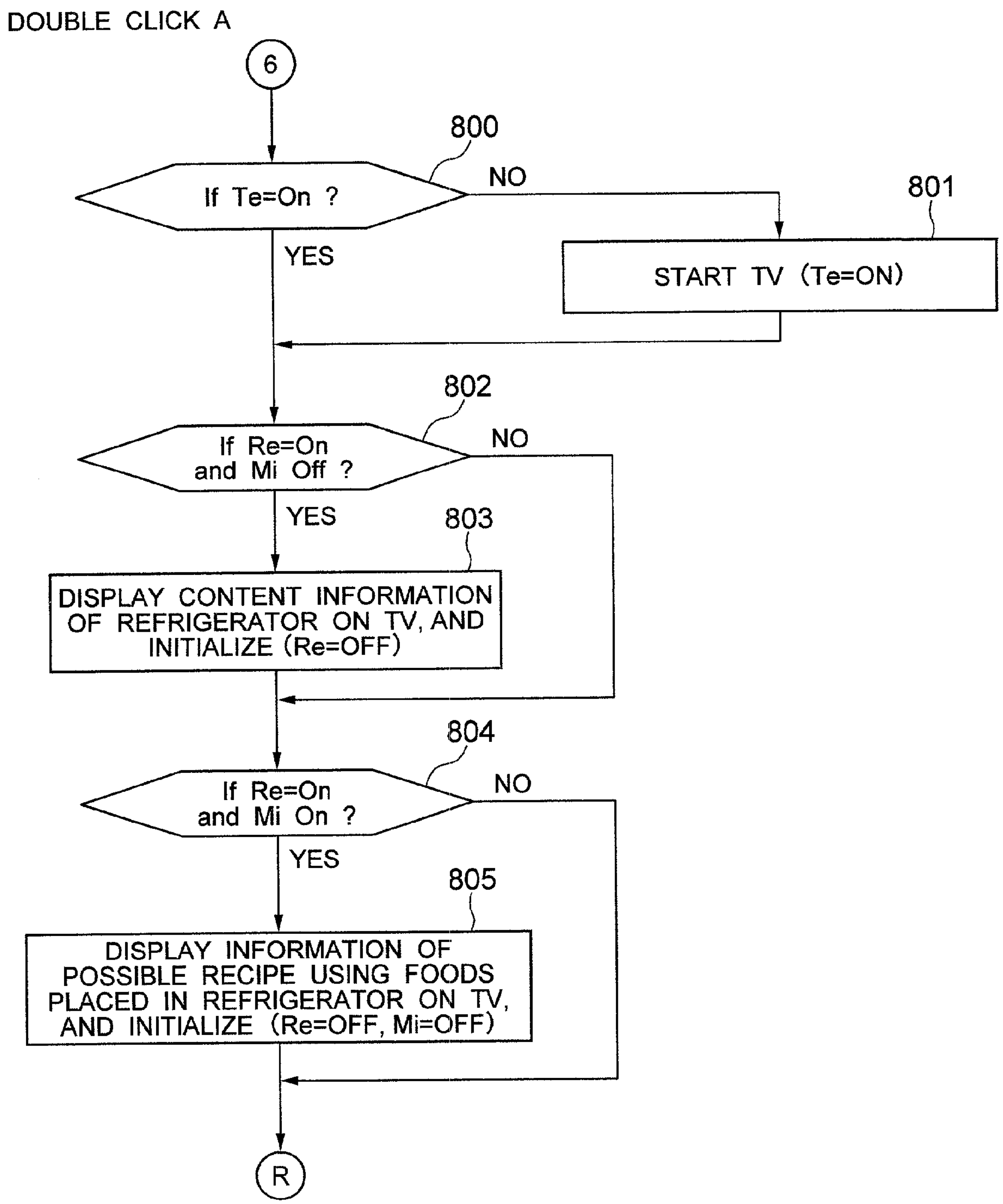
FIG. 19 is a flowchart of the information displaying control (6) of TV set in step 107 of FIG. 9.

⑤ of step 107 in FIG. 19; i.e., the case when the pointer 7 is within the apparatus recognition range $AR_9$ (FIG. 6B) of TV set 9, and when the A-button 4_a_ is single-clicked on the remote controller 4:

In this case, control is made according to the flowchart of FIG. 18.

That is, the user half-pushed the A-button 4_a_ with the remote controller 4 directed to the TV set 9 so that the laser beam can be applied as the pointer 7 to the TV set 9, and the A-button 4_a_ of remote controller 4 is once full-pushed, or single-clicked. When the personal computer 3_c_ of control box 3 detects from the output of the video camera 1 that this pointer 7 is within the apparatus recognition range $AR_9$ of TV set 9, it checks the status parameter Te of TV set 9 on the basis of the apparatus status database 3$C_3$ in the storage portion 3C (see FIG. 7) (step 700 in FIG. 18). If Te=ON, the TV set 9 is decided to be in the on-state, and a control signal is transmitted to the TV set 9, energizing the relay 16_d_ (see FIG. 5) to switch the TV set 9 off. Moreover, the status parameter Te on the apparatus status database 3$C_3$ is turned OFF (step 701). If the TV set 9 is off (Te≠ON in step 700 in FIG. 17), similarly the TV set 9 is turned on, and the status parameter Te on the apparatus status database 3$C_3$ is turned ON (step 702 in FIG. 18).

Thus, each time the A-button 4_a_ of remote controller 4 is single-clicked under the condition that the TV set 9 is designated by the pointer 7, the TV set 9 can be repeatedly started to be turned on and off.

Here, when the TV set 9 is in the on-state, the pointer 7 is applied to the TV set 9, and the A-button 4_a_ is double clicked, thereby causing the operation panel of TV set 9 to be displayed so that the setting items such as channel and sound volume can be changed as in the case of air conditioner 10. The operation panel may be displayed on the surface of a wall near the TV set 9 or superimposed on a program displayed on the screen of TV set 9. When the pointer 7 is matched to the displayed operation panel, and the A-button 4_a_ is double clicked, the operation panel disappears.

⑥ of step 107 in FIG. 9; i.e., the case when the pointer 7 is within the apparatus recognition range $AR_9$ (FIG. 6B) of the TV set 9, and when the A-button 4_a_ is double clicked on the remote controller 4:

In this case, the TV set 9 is controlled according to the flowchart of FIG. 19.

That is, the user half-pushes the A-button 4_a_ with the remote controller 4 directed to the TV set so that the laser beam can be applied as the pointer 7 to the TV set 9, and the A-button 4_a_ of remote controller 4 is double clicked. At this time, the personal computer 3_c_ detects that the coordinate position of the pointer 7 within the controlable region 6 is within the apparatus recognition range $AR_9$ of TV set 9. If the status parameter Te of this TV set 9 on the apparatus status database 3$C_3$ (FIG. 7) is ON (i.e., if TV set 9 is in the on-state: step 800), the processing goes directly to step 802. If this status parameter Te is OFF (i.e., the TV set 9 is in the off-state), the personal computer 3_c_ energizes the relay 16_d_ (FIG. 5), thereby switching TV set 9 on, and the processing goes to step 802.

At this time, when both refrigerator 8 and electronic oven 13 are not designated, the operation panel of TV set 9 is displayed as described above. In addition, when the A-button 4_a_ of remote controller 4 is double clicked under the same state, the processing goes through steps 802, 804 back to the step 104 in FIG. 9, and the TV set 9 is only maintained in the on-state.

Here, in steps 105–107 in FIG. 9, in the case of

Figure 20:
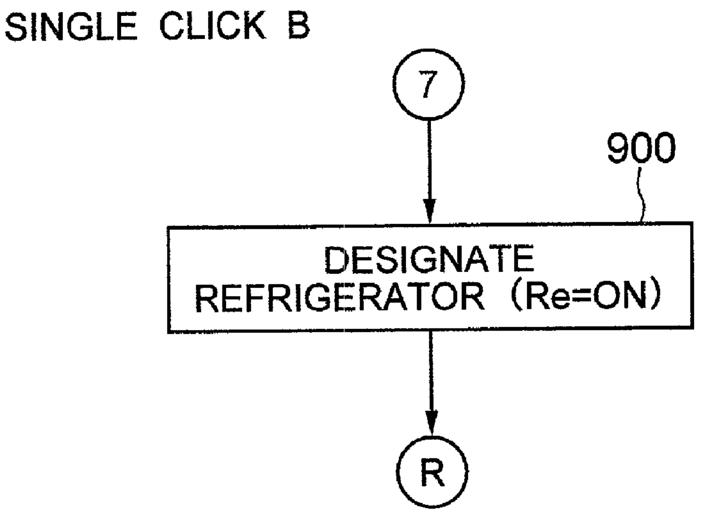
FIG. 20 is a flowchart of designate control (7) of refrigerator in step 107 of FIG. 9.

⑦ of step 107; i.e., when the B-button 4_b_ (see FIG. 4) of remote controller 4 is full-pushed, or single-clicked under the condition that the pointer 7 is within the apparatus recognition range $AR_8$ (FIG. 6B) of refrigerator 8, the refrigerator 8 is decided to be designated, and thus the status parameter Re of the refrigerator 8 is ON on the apparatus status database 3$C_3$ in the storage portion 3C of control box 3 as shown in FIG. 20. Thus, the refrigerator 8 is in the state in which it is specified.

Similarly, in the case of

Figure 21:
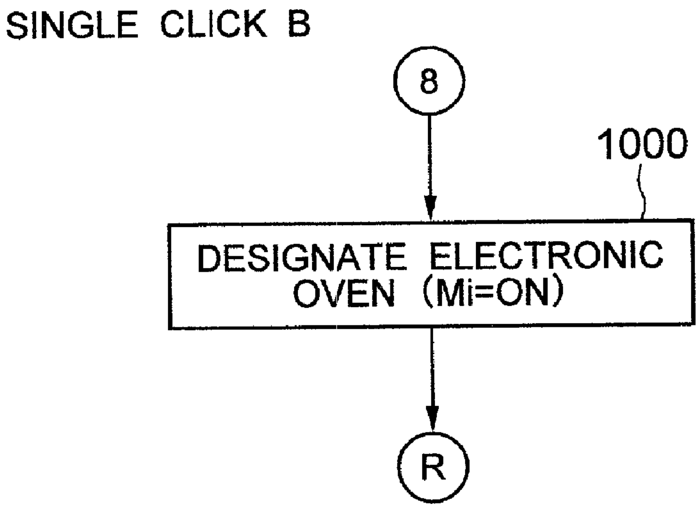
FIG. 21 is a flowchart of designate control (8) of electronic oven in step 107 of FIG. 9.

⑧ of step 107; i.e., when the B-button 4_b_ (see FIG. 4) of remote controller 4 is full-pushed, or single-pushed on the remote controller 4 under the condition that the pointer 7 is within the apparatus recognition range $AR_{13}$ (FIG. 6B) of electronic oven 13, the electronic oven 13 is decided to be designated, and the status parameter Mi for the electronic oven 13 is ON on the apparatus status database 3$C_3$ in the storage portion 3C of control box 3 as shown in FIG. 21. Hence, the electronic oven 13 is shown to be in the specified state.

Figure 22A:
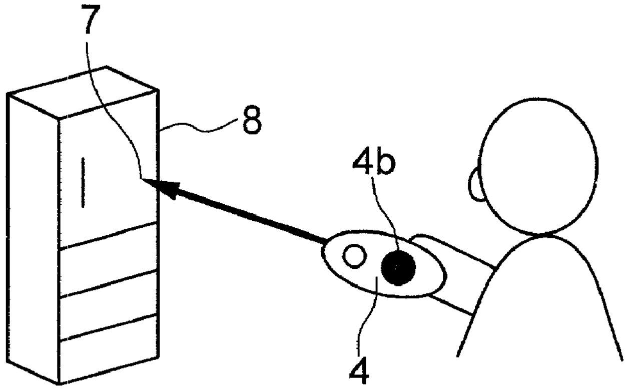
FIGS. 22A and 22B are diagrams showing user's operation to display on TV set the information of the refrigerator by the information displaying control (6) of FIG. 19.
Figure 22B:
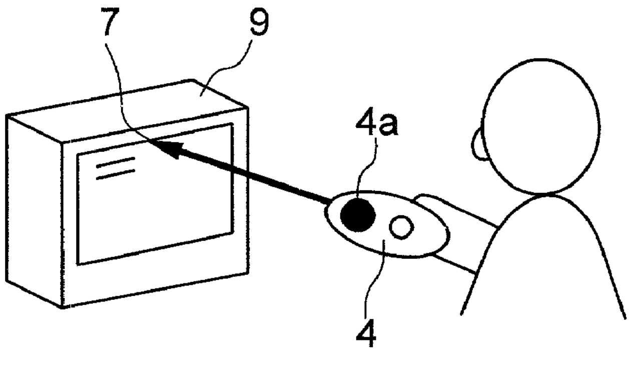

Thus, as shown in FIG. 22A, the refrigerator 8 is pointed by the pointer 7, and the B-button 4_b_ of remote controller 4 is single-clicked to specify the refrigerator 8. Under this condition, as shown in FIG. 22B, the A-button 4_a_ of remote controller 4 is double clicked while the pointer 7 is being applied to TV set 9; thereby switching the TV set 9 on (step 800) as in FIG. 19 or the TV set 9 is turned on (step 801) as shown in FIG. 19. At this time, the personal computer 3_c_ detects, if the refrigerator 8 and electronic oven 13 are designated, from the status parameters Re, Mi on the apparatus status database 3$C_3$ in the storage portion 3C. The result is that Re=ON, and that Mi=OFF, i.e., only the refrigerator 8 is decided to be specified.

Here, at the time of the initial status setting (step 101) in FIG. 9, the information (list of foods and drinks as recipe ingredients placed) within refrigerator 8 is read out by the control box 3 and stored in the storage portion 3C. In addition, for example, means for registering foods is provided for this refrigerator 8. When the user takes foods and drinks in and out of the refrigerator 8 for recipe ingredients, the names of the ingredients are registered by this means. This registering means may be input means such as a keyboard, so that when the user takes ingredients in and out, the names thereof are entered by this means. Or a barcode sensor may be provided to read out the barcodes of the names attached to the purchased foods.

In the refrigerator 8 is provided means for managing the foods and drinks to be taken in and out. This managing means modifies the list of products contained when foods and/or drinks are taken in or out.

Figure 23A:
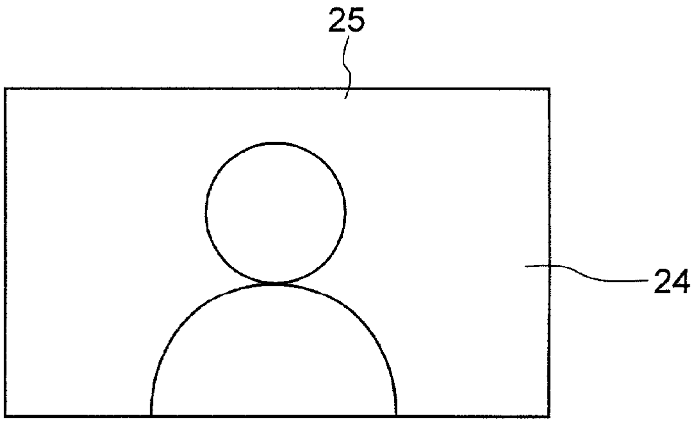
FIGS. 23A, 23B and 23C are diagrams showing examples of images displayed on TV set under the control operation of FIG. 19.
Figure 23B:
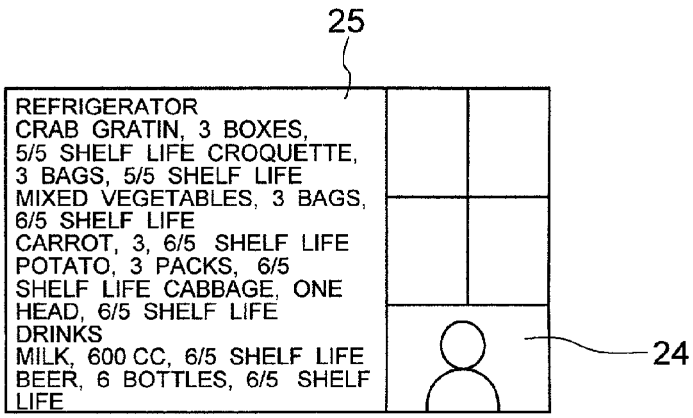

Turning back to FIG. 19, when only the refrigerator 8 is specified by the user who operates as shown in FIG. 22A, the status parameters are found as Re=ON, and Mi=OFF (step 802). Thus, when the A-button 4*a* of remote controller 4 is double clicked while the pointer 7 is being applied to the TV set 9 as shown in FIG. 22B, the personal computer 3*c* reads out foods information of refrigerator 8 from the storage portion 3C, and as shown in FIG. 23B, it causes information 25 within refrigerator 8 to be displayed on the TV set 9 that is also displaying a broadcast program 24 as shown in FIG. 23A. Also, the personal computer 3*c* initializes the status parameter Re for specifying refrigerator 8 to be OFF on the apparatus status database $3C_3$ in the storage portion 3C (step 803 in FIG. 19).

Thus, the user can see the foods placed in the refrigerator 8 from the display screen of TV set 9.

Figure 23C:
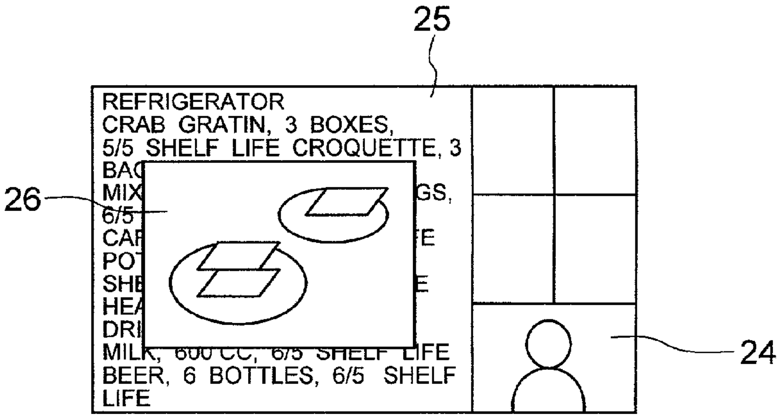
Figure 24A:
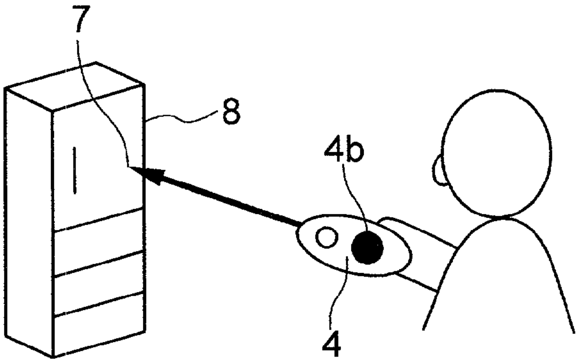
FIGS. 24A, 24B and 24C are diagrams showing examples of user's operation to display on TV set the information about cooking of refrigerated foods under the control (6) of FIG. 19 in step 107.
Figure 24B:
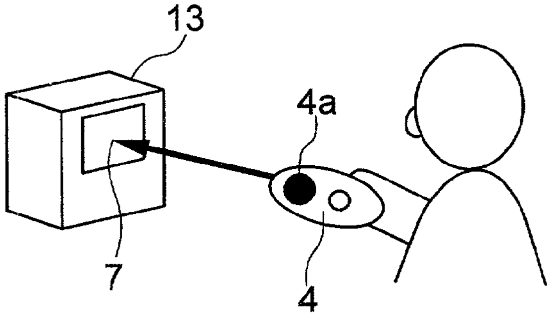
Figure 24C:
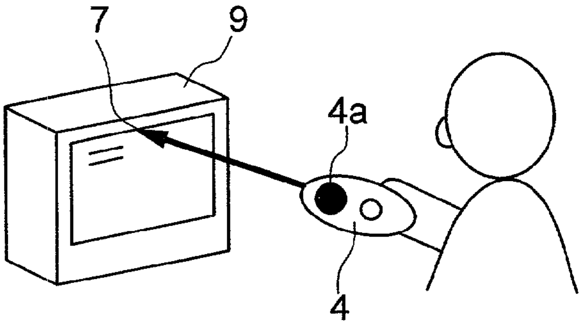

Moreover, as shown in FIG. 24A, the refrigerator 8 is designated by the same operation as in FIG. 22A, and as shown in FIG. 24B, the electronic oven 13 is also specified by single-clicking the B-button 4*b* of remote controller 4. Then, as shown in FIG. 24C, the A-button 4*a* is double clicked on the TV set 9 same as in FIG. 22B. At this time, Re=ON, and Mi=ON. This means that both the refrigerator 8 and electronic oven 13 have been designated (step 804 in FIG. 19). The possible recipes using current foods placed in refrigerator 8 are searched according to, for example, recorded cooking programs that were broadcast so far or received through Internet, and the resulting information 26 about recipe is displayed on TV set 9 as shown in FIG. 23C. Then, the personal computer 3*c* initializes the status parameters Re, Mi for specifying refrigerator 8 and electronic oven 13 on the apparatus status database $3C_3$ of storage portion 3C to be OFF (step 805 in FIG. 19).

When the A-button 4*a* of remote controller 4 is double clicked under the condition that the pointer 7 is within the apparatus recognition range $AR_9$ (FIG. 6B) of the TV set 9, and in this case when the electronic oven 13 as well as refrigerator 8 is already specified, the information of recipe is immediately displayed as shown in FIG. 23C through steps 802 and 804. In this case, under the condition that the information 25 of foods placed in the refrigerator 8 is displayed (step 803 in FIG. 19) as shown in FIG. 23B, when the electronic oven 13 is designated as shown in FIG. 24B, the routine goes from step 803 through step 804 to step 805, where the information 26 of recipe is displayed as shown in FIG. 23C.

In addition, under the condition that the list of foods placed in the refrigerator 8 is displayed (step 803 in FIG. 19) as shown in FIG. 23B or that the recipe information is displayed (step 805 in FIG. 19) as shown in FIG. 23C, the A-button 4*a* of remote controller 4 is double clicked with the pointer 7 matched to TV set 9, and at this time the processing goes back to step 104 in FIG. 9.

[Displaying Other Items]

Figure 25:
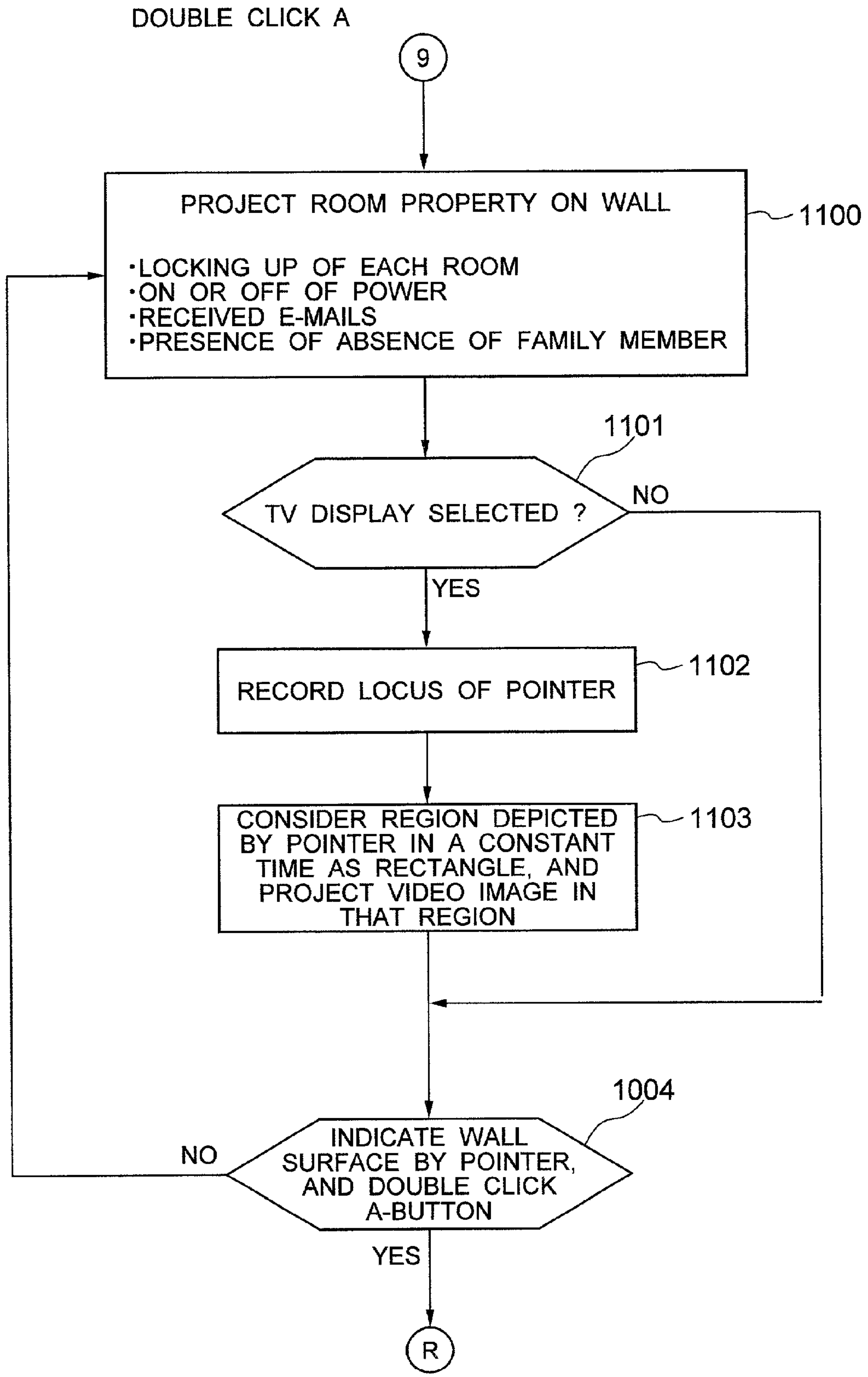
FIG. 25 is a flowchart of information displaying control (9) of step 107 in FIG. 9.

⑨ of step 107 in FIG. 9; i.e., the case when the A-button 4*a* of remote controller 4 is double clicked under the condition that the pointer 7 is placed within other region than apparatus recognition ranges $AR_8$~$AR_{11}$, $AR_{13}$ of controlable range 6:

In this case, control is made according to the flowchart shown in FIG. 25.

Figure 26A:
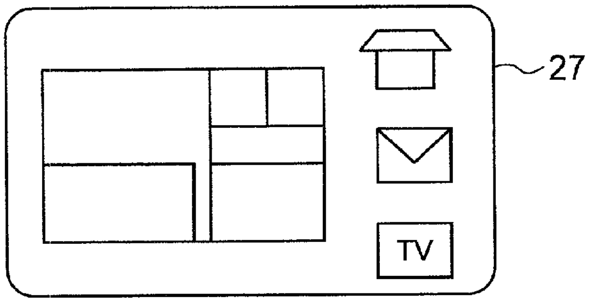
FIGS. 26A, 26B and 26C are diagrams showing examples of information displayed on the wall surface under the control operation of FIG. 25.
Figure 26B:
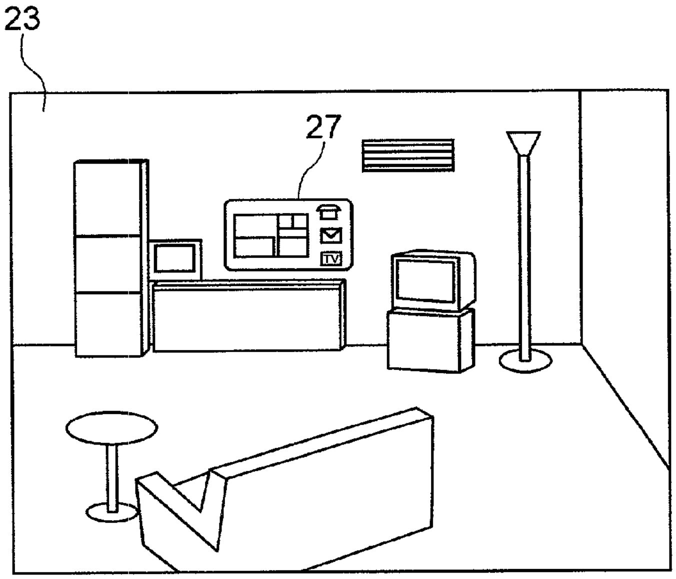

That is, when the A-button 4*a* of remote controller 4 is double clicked under the condition that the pointer 7 is placed within other region than the apparatus recognition ranges $AR_8$~$AR_{11}$, $AR_{13}$ of controlable range 6, the personal computer 3*c* reads information 27 of room property (attribute) shown in FIG. 26A from the storage portion 3C, and supplies it to the projector 2. The projector 2 projects this information image 27 on a predetermined place of the wall surface 23 as shown in FIG. 26B. This room property is, for example, the locked situations of each room, the state in which each room is powered or not, information of received e-mails and current situation of family members. This room property information is supplied from each monitor to the personal computer 3*c*, and stored in the storage portion 3C (step 1100 in FIG. 25).

Under this situation, when the A-button 4*a* is again double clicked, the displaying is finished, and the processing goes back to step 104 in FIG. 9 (step 1104 in FIG. 25).

Figure 26C:
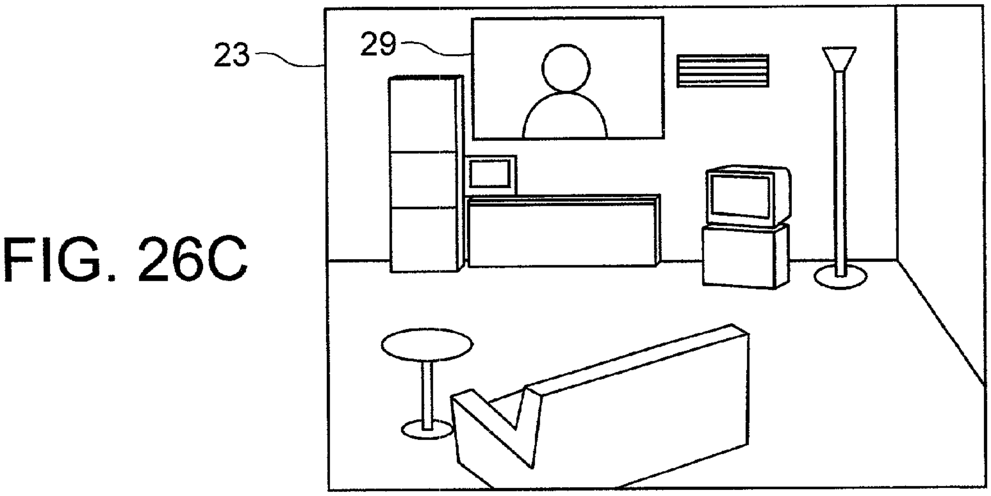
Figure 27A:
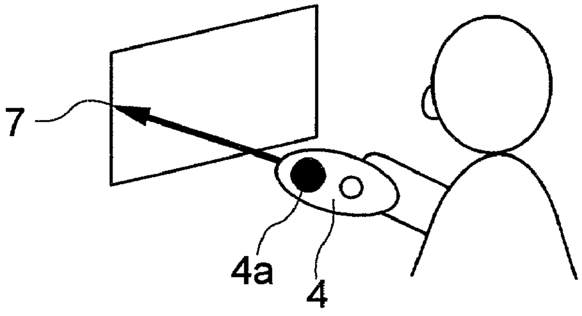
FIGS. 27A and 27B are diagrams showing examples of user's operation for the control operation of FIG. 25.
Figure 27B:
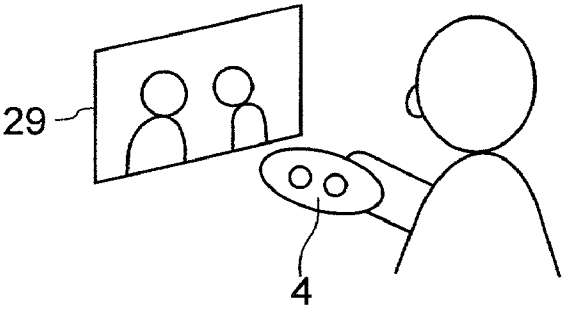

The room property information 27 displayed shown in FIG. 26A includes a menu for selecting "TV program", "weather conditions", "security check" and "room property". Under this condition shown in FIG. 26B, the A-button 4*a* is single-clicked with the pointer 7 matched to one of the items (here, "TV program"), thus selecting it (step 1101 in FIG. 25). Also, while the A-button 4*a* is being half-pushed, the remote controller 4 is moved so that a locus 28 is depicted by pointer 7 on a certain area of wall 23, and the A-button 4*a* is single-clicked (step 1102 in FIG. 25). Thus, a rectangular region 29 substantially corresponding to the depicted locus 28 is set up. Within this region 29, is projected and displayed a television program of a certain channel by the projector 2 as shown in FIG. 26C. This TV program is received by a separately provided television receiver. This received video signal is supplied to the projector 2 under the control of personal computer 3*c*. This region 29 also includes an operation panel (not shown) on which the received channel and sound volume can be changed when the A-button 4*a* is single clicked with the pointer 7 matched to a proper point (step 1103).

When the A-button 4*a* is double clicked under the condition that the pointer 7 is placed on the wall surface 27 and that the TV program is displayed, the displaying is finished, and the processing goes back to step 104 in FIG. 9.

Thus, in this embodiment, desired information can be displayed by simple operation of pointer on the surface of wall 23.

In FIG. 9, when the apparatus in the room are not controlled with the remote controller 4 and the room is not in a controlled state, the condition of step 104 is brought about. In this condition, when the system of this embodiment is stopped by operating the above main switch, each appliance is returned back to the initial state (step 108).

Thus, according to this embodiment, the electric appliances can be remotely controlled by only directing the pointer 7 to the associated one of the appliances. Since this pointer is displayed to be visible, the associated appliance can be designated by very easy operation without mistake. In addition, since different appliances can be remotely controlled by the common operation method, the remote controller can be constructed to be simple and the operation thereof is also simple.

If the user sets the pointer 7 on the surface of the associated appliance, this pointer 7 is sure to be placed within the apparatus recognition range for this appliance. Thus, under this condition, the above remote control operations can be made by clicking the A-button 4*a* and B-button 4*b* of remote controller 4.

Also, when the control mode is decided by the movement of pointer 7 as in the control of lamp 11, the apparatus recognition range of electric appliances is required to be set wider to some degree than the actual surface of the appliance. Thus, in the dimming mode of lamp 11 as, for example, shown in FIG. 11B, even when the pointer 7 is not on the surface of lamp 11, but out of the surface, the pointer 7 is moved up and down, thereby making the brightness of lamp 11 increase or decrease. This operation can be similarly made for other appliances. Moreover, in this embodiment, even when more than two appliances of the same type, such as two lamps 11, are provided, these appliances can be separately remotely controlled by setting the apparatus recognition range for each one.

In addition, while the remote controller emits a visible laser beam for pointer 7 that points to an electric appliance in this embodiment, the remote controller may emit a directional electromagnetic wave including a non-visible laser beam, in which case a sheet-like substance that emits visible light of a particular wavelength is attached on a certain part of each appliance or wall and excited by this electromagnetic wave. Thus, when this electromagnetic wave is irradiated from the remote controller to the sheet-like substance, a visible pointer appears on this irradiated region.

Also, while all the electric appliances to be controlled are installed within the field of view 6 of video camera 1 in this embodiment, the apparatus recognition ranges for the appliances to be controlled may be within the field of view 6 of video camera 1. Even in this case, these appliances can be remotely controlled. If the refrigerator 8, for example, is provided in another room and thus not placed within the field of view 6 of video camera 1 unlike the scene in FIG. 1, provided that the apparatus recognition range $AR_8$ for this refrigerator 1 is set within the field view 6 of video camera 1, the pointer 7 is used to point to this apparatus recognition range $AR_8$, thereby designating this refrigerator 8. The setting of the apparatus recognition range is made by the user's operation using the pointer as described previously. Thus, the place in which the apparatus recognition range is set is not required to be coincident with the place where the associated appliance is installed. However, since the user cannot view this apparatus recognition range, any mark is placed at the set position, a pamphlet for the guide is previously produced or the user points to the wall surface by the pointer so that the pointed region is detected to be within the apparatus recognition range by the control box 3 from the output from the video camera 1. At this time, the control box 3 causes the projector to project and display the image of an appliance out of the field of view 6 or operation panel at the place, thus informing the user.

Thus, according to the invention, electric appliances of different types can be simply controlled by simple operation, and the appliance to be controlled can be selected by a simple method. The operationality can be improved to a great extent.

It should be further understood by those skilled in the art that the foregoing description has been made on embodiments of the invention and that various changes and modifications may be made in the invention without departing from the spirit of the invention and the scope of the appended claims.

What is claimed is:

1. A network system for remotely controlling a plurality of objects to be controlled including electric appliances, comprising:

a video camera of which a field of view or a controlable range within the field is set to include said objects to be controlled and which detects only light of a particular wavelength region;

a remote controller for generating electromagnetic waves toward a given position within said field of view or within said controlable range to form a light pointer of said particular wavelength range at said position irradiated with said electromagnetic waves, and capable of remote controlling; and a control unit that processes an output signal from said video camera to detect at least one, indicated by said pointer, of said objects to be controlled, receives from said remote controller an operation signal associated with the remote controlling on said indicated object, and supplies a control signal according to said operation signal through a network to said indicated object, wherein, when receiving said operation signal, said control unit detects an operational state of said indicated object by using a database storing operational states of said plurality of objects so as to determine the control signal for controlling said indicated object to operate according to said operation signal, so that said indicated object can be remotely controlled by said remote controller.

2. A network system for remotely controlling objects to be controlled, such as electric appliances, comprising:

a video camera of which a field of view or a controlable range within the field is set to include said objects to be controlled and which detects only light of a particular wavelength region;

a remote controller for generating electromagnetic waves toward a given position within said field of view or within said controlable range to form a light pointer of said particular wavelength range at said position irradiated with said electromagnetic waves, and capable of remote controlling; and a control unit that processes an output signal from said video camera to detect any one or ones, indicated by said pointer, of said objects to be controlled, receives from said remote controller an operation signal associated with the remote controlling on said indicated object, and supplies a control signal according to said operation signal through a network to said object indicated by said pointer, so that said object indicated by said pointer can be remotely controlled by said remote controller, wherein for each of said electric appliances, an apparatus recognition range is set to define the range of said appliance within said field of view of said video camera, and said control unit, when one of said apparatus recognition ranges is selected by said pointer, detects said appliance associated with said apparatus recognition range indicated by said pointer, and supplies said control signal to said detected appliance.

3. A network system according to claim 2, wherein said appliance is a lamp, and said control unit controls said lamp to be switched on and off each time said lamp is designated by said pointer, and controls said lamp to increase or decrease its brightness by moving said pointer within said apparatus recognition range of said lamp made in the on-state.

4. A network system according to claim 2, wherein said electric appliance is an air conditioner, a projector is additionally provided to project an image on a region other than said apparatus recognition ranges that are included within said field of view or said controlable range, said control unit controls said air conditioner to be switched on and off each time said air conditioner is designated by said pointer, and said control unit controls said projector, by designating said air conditioner by said pointer and by proper operations on said remote controller, to display an operation panel for said air conditioner within said field of view or within said controlable range so that said air conditioner can be remotely controlled on said operation panel.

5. A network system according to claim 2, wherein said electric appliance is a television set, a projector is additionally provided to project an image on a region other than said apparatus recognition ranges within said field of view or said controlable range, said control unit controls said television set to be switched on and off each time said television set is designated by said pointer, and said control unit controls said projector, by use of said pointer to indicate said television set and by use of said remote controller to make a certain remote controlling operation, so that an operation panel for said television set can be displayed on a region within said field of view or said controlable range and that said television set can be remotely controlled on said operation panel.

6. A network system for remotely controlling objects to be controlled, such as electric appliances, comprising:

a video camera of which a field of view or a controlable range within the field is set to include said objects to be controlled and which detects only light of a particular wavelength region;

a remote controller for generating electromagnetic waves toward a given position within said field of view or within said controlable range to form a light pointer of said particular wavelength range at said position irradiated with said electromagnetic waves, and capable of remote controlling; and a control unit that processes an output signal from said video camera to detect any one or ones, indicated by said pointer, of said objects to be controlled, receives from said remote controller an operation signal associated with the remote controlling on said indicated object, and supplies a control signal according to said operation signal through a network to said object indicated by said pointer, so that said object indicated by said pointer can be remotely controlled by said remote controller, wherein said electric appliances are a television set and a refrigerator, said control unit registers said refrigerator to be in a designated state by specifying said refrigerator by said pointer, and under the condition that the specification of said refrigerator is registered, said control unit controls said television set, by use of said pointer to designate said television set, and by use of said remote controller to make a certain remote controlling operation, so that the state in which foods are placed in said refrigerator can be displayed on said television set.

7. A network system for remotely controlling objects to be controlled, such as electric appliances, comprising:

a video camera of which a field of view or a controlable range within the field is set to include said objects to be controlled and which detects only light of a particular wavelength region;

a remote controller for generating electromagnetic waves toward a given position within said field of view or within said controlable range to form a light pointer of said particular wavelength range at said position irradiated with said electromagnetic waves, and capable of remote controlling; and a control unit that processes an output signal from said video camera to detect any one or ones, indicated by said pointer, of said objects to be controlled, receives from said remote controller an operation signal associated with the remote controlling on said indicated object, and supplies a control signal according to said operation signal through a network to said object indicated by said pointer, so that said object indicated by said pointer can be remotely controlled by said remote controller, wherein said electric appliances are a television set, a refrigerator and an electronic oven, said control unit registers said refrigerator and said electronic oven to be in a registered state by use of said pointer to designate said refrigerator and said electronic oven, and under the condition that the designation of said refrigerator and said electronic oven is registered, said control unit controls said television set, by use of pointer to designate said television set and by use of said remote controller to make a certain remote controlling operation, so that information of possible recipes using foods placed in said refrigerator is displayed on said television set.

8. A network system for remotely controlling objects to be controlled, such as electric appliances, comprising:

a video camera of which a field of view or a controlable range within the field is set to include said objects to be controlled and which detects only light of a particular wavelength region;

a remote controller for generating electromagnetic waves toward a given position within said field of view or within said controlable range to form a light pointer of said particular wavelength range at said position irradiated with said electromagnetic waves, and capable of remote controlling; and a control unit that processes an output signal from said video camera to detect any one or ones, indicated by said pointer, of said objects to be controlled, receives from said remote controller an operation signal associated with the remote controlling on said indicated object, and supplies a control signal according to said operation signal through a network to said object indicated by said pointer, so that said object indicated by said pointer can be remotely controlled by said remote controller, wherein said electric appliances are a television set, a refrigerator and an electronic oven, said control unit registers said refrigerator and said electronic oven to be in a designated state by designating said refrigerator and said electronic oven by use of pointer to designate said refrigerator and said electronic oven, under the condition that said refrigerator and said electronic oven are designated, said control unit controls said television set, by use of pointer to designate said television set and by use of said remote controller to make a certain remote controlling operation, so that the sate in which foods are placed in said refrigerator is displayed on said television set, and under the condition that the state in which foods are placed in said refrigerator is displayed on said television set, said control unit controls said television set by registering said electronic oven, so that information of possible recipes using foods placed in said refrigerator can be displayed on said television set.

9. A network system according to claim 2, wherein a projector is additionally provided to project an image on a region other than said apparatus recognition ranges within said field of view or said controlable range, and by depicting a frame by said pointer on a region other than said apparatus recognition ranges within said field of view or said controlable range, said control unit detects the position of said frame from the output of said video camera, and controls said projector to project and display an image within said frame.

10. A network system according to claim 2, wherein said electric appliances are a television set and a refrigerator, said control unit registers said refrigerator to be in a designated state by specifying said refrigerator by said pointer, and under the condition that the specification of said refrigerator is registered, said control unit controls said television set, by use of said pointer to designate said television set, and by use of said remote controller to make a certain remote controlling operation, so that the state in which foods are placed in said refrigerator can be displayed on said television set.

11. A network system according to claim 2, wherein said electric appliances are a television set, a refrigerator and an electronic oven, said control unit registers said refrigerator and said electronic oven to be in a registered state by use of said pointer to designate said refrigerator and said electronic oven, and under the condition that the designation of said refrigerator and said electronic oven is registered, said control unit controls said television set, by use of pointer to designate said television set and by use of said remote controller to make a certain remote controlling operation, so that information of possible recipes using foods placed in said refrigerator is displayed on said television set.

12. A network system according to claim 2, wherein said electric appliances are a television set, a refrigerator and an electronic oven, said control unit registers said refrigerator and said electronic oven to be in a designated state by designating said refrigerator and said electronic oven by use of pointer to designate said refrigerator and said electronic oven, under the condition that said refrigerator and said electronic oven are designated, said control unit controls said television set, by use of pointer to designate said television set and by use of said remote controller to make a certain remote controlling operation, so that the sate in which foods are placed in said refrigerator is displayed on said television set, and under the condition that the state in which foods are placed in said refrigerator is displayed on said television set, said control unit controls said television set by registering said electronic oven, so that information of possible recipes using foods placed in said refrigerator can be displayed on said television set.

* * * * *